(12) United States Patent
Smrha et al.

(10) Patent No.: US 8,596,882 B2
(45) Date of Patent: Dec. 3, 2013

(54) MANAGED CONNECTIVITY IN FIBER OPTIC SYSTEMS AND METHODS THEREOF

(75) Inventors: Mark Smrha, West Chicago, IL (US); Michael D. Schroeder, Webster, MN (US); Michael Gunderson, Shakopee, MN (US); Vern Loch, Prior Lake, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 256 days.

(21) Appl. No.: 12/905,658

(22) Filed: Oct. 15, 2010

(65) Prior Publication Data

US 2011/0116748 A1    May 19, 2011

Related U.S. Application Data

(60) Provisional application No. 61/252,386, filed on Oct. 16, 2009.

(51) Int. Cl.
*G02B 6/36* (2006.01)

(52) U.S. Cl.
USPC .......................................................... 385/76

(58) Field of Classification Search
USPC .......................................................... 385/76
See application file for complete search history.

(56) References Cited

U.S. PATENT DOCUMENTS

| | | | |
|---|---|---|---|
| 4,721,358 A * | 1/1988 | Faber et al. ..................... | 385/56 |
| 4,953,194 A | 8/1990 | Hansen et al. | |
| 4,968,929 A | 11/1990 | Hauck et al. | |
| 4,978,310 A | 12/1990 | Shichida | |
| 5,052,940 A | 10/1991 | Bengal | |
| 5,107,532 A | 4/1992 | Hansen et al. | |
| 5,161,988 A | 11/1992 | Krupka | |
| 5,166,970 A | 11/1992 | Ward | |
| 5,222,164 A | 6/1993 | Bass, Sr. et al. | |
| 5,265,187 A | 11/1993 | Morin et al. | |
| 5,305,405 A | 4/1994 | Emmons et al. | |

(Continued)

FOREIGN PATENT DOCUMENTS

DE           102 44 304 B3      3/2004
DE      10 2004 033 940 A1      2/2006

(Continued)

OTHER PUBLICATIONS

Invitation to Pay Additional Fees with Partial International Search mailed Jan. 4, 2011.

(Continued)

*Primary Examiner* — Charlie Peng
(74) *Attorney, Agent, or Firm* — Merchant & Gould P.C.

(57) ABSTRACT

A fiber optic connector arrangement includes a printed circuit board coupled to a connector housing. The printed circuit board includes a memory storage device that is configured to store physical layer information pertaining to the fiber optic connector arrangement. The printed circuit board also defines contacts that are electrically coupled to the memory storage device to enable the physical layer information to be read from the memory storage device by a media reading interface. A connector assembly includes at least one adapter assembly; a printed circuit board; and a media reading interface. The connector assembly also may include a tactile pressure sensor. The adapter assembly defines at least a first port and a second port that are configured to connect optical fibers of two connector arrangements. One or more connector assemblies can be mounted to a fiber panel system.

12 Claims, 27 Drawing Sheets

(56) References Cited

U.S. PATENT DOCUMENTS

| | | | |
|---|---|---|---|
| 5,353,367 A | 10/1994 | Czosnowski et al. | |
| 5,393,249 A | 2/1995 | Morgenstern et al. | |
| 5,394,503 A | 2/1995 | Dietz, Jr. et al. | |
| 5,413,494 A | 5/1995 | Dewey et al. | |
| 5,418,334 A | 5/1995 | Williams | |
| 5,419,717 A | 5/1995 | Abendschein et al. | |
| 5,448,675 A | 9/1995 | Leone et al. | |
| 5,467,062 A | 11/1995 | Burroughs et al. | |
| 5,473,715 A | 12/1995 | Schofield et al. | |
| 5,483,467 A | 1/1996 | Krupka et al. | |
| 5,497,444 A | 3/1996 | Wheeler | |
| 5,579,425 A | 11/1996 | Lampert et al. | |
| 5,685,741 A | 11/1997 | Dewey et al. | |
| 5,712,942 A | 1/1998 | Jennings et al. | |
| 5,717,810 A | 2/1998 | Wheeler | |
| 5,724,467 A | 3/1998 | vandenEnden et al. | |
| 5,758,003 A | 5/1998 | Wheeler et al. | |
| 5,821,510 A | 10/1998 | Cohen et al. | |
| 5,854,824 A | 12/1998 | Bengal et al. | |
| 6,002,331 A | 12/1999 | Laor | |
| 6,116,961 A | 9/2000 | Henneberger et al. | |
| 6,222,908 B1 | 4/2001 | Bartolutti et al. | |
| 6,222,975 B1 | 4/2001 | Gilbert et al. | |
| 6,234,830 B1 | 5/2001 | Ensz et al. | |
| 6,285,293 B1 | 9/2001 | German et al. | |
| 6,300,877 B1 | 10/2001 | Schannach et al. | |
| 6,330,307 B1 | 12/2001 | Bloch et al. | |
| RE37,489 E | 1/2002 | Anton et al. | |
| 6,350,148 B1 | 2/2002 | Bartolutti et al. | |
| 6,409,392 B1 | 6/2002 | Lampert et al. | |
| 6,421,322 B1 | 7/2002 | Koziy et al. | |
| 6,424,710 B1 | 7/2002 | Bartolutti et al. | |
| 6,437,894 B1 | 8/2002 | Gilbert et al. | |
| 6,456,768 B1 | 9/2002 | Boncek et al. | |
| 6,488,416 B1* | 12/2002 | Shishikura et al. | 385/88 |
| 6,499,861 B1 | 12/2002 | German et al. | |
| 6,511,231 B2* | 1/2003 | Lampert et al. | 385/70 |
| 6,522,737 B1 | 2/2003 | Bartolutti et al. | |
| 6,554,484 B2 | 4/2003 | Lampert | |
| 6,574,586 B1 | 6/2003 | David et al. | |
| 6,591,051 B2 | 7/2003 | Solheid et al. | |
| 6,626,697 B1 | 9/2003 | Martin et al. | |
| 6,636,152 B2 | 10/2003 | Schannach et al. | |
| RE38,311 E | 11/2003 | Wheeler | |
| 6,682,230 B1* | 1/2004 | Demangone et al. | 385/88 |
| 6,725,177 B2 | 4/2004 | David et al. | |
| 6,743,044 B2 | 6/2004 | Musolf et al. | |
| 6,802,735 B2 | 10/2004 | Pepe et al. | |
| 6,808,116 B1 | 10/2004 | Eslambolchi et al. | |
| 6,850,685 B2 | 2/2005 | Tinucci et al. | |
| 6,870,734 B2 | 3/2005 | Mertesdorf et al. | |
| 6,898,368 B2 | 5/2005 | Colombo et al. | |
| 6,901,200 B2* | 5/2005 | Schray | 385/135 |
| 6,905,363 B2 | 6/2005 | Musolf et al. | |
| 6,932,517 B2 | 8/2005 | Swayze et al. | |
| 6,971,895 B2* | 12/2005 | Sago et al. | 439/188 |
| 6,976,867 B2* | 12/2005 | Navarro et al. | 439/489 |
| 7,081,808 B2 | 7/2006 | Colombo et al. | |
| 7,088,880 B1 | 8/2006 | Gershman | |
| 7,099,550 B1 | 8/2006 | Too | |
| 7,123,810 B2 | 10/2006 | Parrish | |
| 7,153,142 B2 | 12/2006 | Shifris et al. | |
| 7,165,728 B2 | 1/2007 | Durrant et al. | |
| 7,193,422 B2 | 3/2007 | Velleca et al. | |
| 7,226,217 B1 | 6/2007 | Benton et al. | |
| 7,234,944 B2 | 6/2007 | Nordin et al. | |
| 7,297,018 B2 | 11/2007 | Caveney et al. | |
| 7,312,715 B2 | 12/2007 | Shalts et al. | |
| 7,315,224 B2 | 1/2008 | Gurovich et al. | |
| 7,352,289 B1 | 4/2008 | Harris | |
| 7,356,208 B2 | 4/2008 | Becker | |
| 7,370,106 B2 | 5/2008 | Caveney | |
| 7,374,101 B2* | 5/2008 | Kaneko | 235/492 |
| 7,458,517 B2 | 12/2008 | Durrant et al. | |
| 7,479,032 B2 | 1/2009 | Hoath et al. | |
| 7,519,000 B2 | 4/2009 | Caveney et al. | |
| 7,552,872 B2 | 6/2009 | Tokita et al. | |
| 7,570,860 B2 | 8/2009 | Smrha et al. | |
| 7,570,861 B2 | 8/2009 | Smrha et al. | |
| 7,583,883 B2* | 9/2009 | Kowalczyk et al. | 385/134 |
| RE41,460 E | 7/2010 | Wheeler | |
| 7,869,426 B2 | 1/2011 | Hough et al. | |
| 7,872,738 B2 | 1/2011 | Abbott | |
| 7,873,252 B2 | 1/2011 | Smrha et al. | |
| 7,873,253 B2 | 1/2011 | Smrha et al. | |
| 7,965,186 B2* | 6/2011 | Downie et al. | 340/572.1 |
| 8,264,366 B2* | 9/2012 | Chamarti et al. | 340/686.4 |
| 8,333,518 B2* | 12/2012 | Jones et al. | 385/92 |
| 2004/0052471 A1 | 3/2004 | Colombo et al. | |
| 2004/0117515 A1 | 6/2004 | Sago et al. | |
| 2004/0240807 A1 | 12/2004 | Frohlich et al. | |
| 2006/0160395 A1 | 7/2006 | Macauley et al. | |
| 2006/0193591 A1 | 8/2006 | Rapp et al. | |
| 2006/0228086 A1 | 10/2006 | Holmberg et al. | |
| 2007/0116411 A1 | 5/2007 | Benton et al. | |
| 2007/0237470 A1 | 10/2007 | Aronson et al. | |
| 2008/0100456 A1 | 5/2008 | Downie et al. | |
| 2008/0100467 A1 | 5/2008 | Downie et al. | |
| 2008/0175550 A1 | 7/2008 | Coburn et al. | |
| 2009/0097846 A1 | 4/2009 | Kozischek et al. | |
| 2009/0166404 A1 | 7/2009 | German et al. | |
| 2009/0232455 A1 | 9/2009 | Nhep | |
| 2010/0211664 A1 | 8/2010 | Raza et al. | |
| 2010/0211665 A1 | 8/2010 | Raza et al. | |
| 2010/0211697 A1 | 8/2010 | Raza et al. | |
| 2010/0215049 A1 | 8/2010 | Raza et al. | |
| 2011/0085774 A1* | 4/2011 | Murphy et al. | 385/134 |

FOREIGN PATENT DOCUMENTS

| | | | |
|---|---|---|---|
| EP | 1 237 024 A1 | 9/2002 | |
| EP | 1 467 232 A1 | 10/2004 | |
| GB | 2 236 398 A | 4/1991 | |
| JP | 2002-366904 A | * 12/2002 | |
| WO | WO 00/72074 A1 | 11/2000 | |
| WO | WO 02/086573 A1 | 10/2002 | |
| WO | WO 2010/001400 A1 | 1/2010 | |
| WO | WO 2010/121639 A1 | 10/2010 | |

OTHER PUBLICATIONS

International Search Report and Written Opinion mailed Mar. 8, 2011.

TrueNet; TFP Series Rack Mount Fiber Panels, Spec Sheet; May 2008; 8 pages.

Ohtsuki, F. et al., "Design of Optical Connectors with ID Modules," *Electronics and Communications in Japan*, Part 1, vol. 77, No. 2, pp. 94-105 (Feb. 1994).

*Avaya's Enhanced SYSTIMAX® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.

*Avaya's Enhanced SYSTIMAX® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.

*Intelligent patching systems carving out a 'large' niche*, Cabling Installation & Maintenance, vol. 12, Issue 7, Jul. 2004 (5 pages).

*intelliMAC: The intelligent way to make Moves, Adds or Changes!* NORDX/CDT © 2003 (6 pages).

Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.

RiT SMART Cabling System, brochure from RiT Technologies, Ltd., © 2007 (8 pages).

*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.

* cited by examiner

MANAGED CONNECTIVITY IN FIBER OPTIC SYSTEMS AND METHODS THEREOF

CROSS-REFERENCE TO RELATED APPLICATIONS

This application claims priority from provisional application Ser. No. 61/252,386, filed Oct. 16, 2009, and titled Managed Connectivity in Fiber Optic Systems and Methods Thereof, the disclosure of which is hereby incorporated herein by reference.

BACKGROUND

In communications infrastructure installations, a variety of communications devices can be used for switching, cross-connecting, and interconnecting communications signal transmission paths in a communications network. Some such communications devices are installed in one or more equipment racks to permit organized, high-density installations to be achieved in limited space available for equipment.

Communications devices can be organized into communications networks, which typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord" cross connects the two together. In other words, a single logical communication link is often implemented using several segments of physical communication media.

Network management systems (NMS) are typically aware of logical communication links that exist in a communications network, but typically do not have information about the specific physical layer media (e.g., the communications devices, cables, couplers, etc.) that are used to implement the logical communication links. Indeed, NMS systems typically do not have the ability to display or otherwise provide information about how logical communication links are implemented at the physical layer level.

SUMMARY

The present disclosure relates to communications connector assemblies and arrangements that provide physical layer management (PLM) capabilities.

BRIEF DESCRIPTION OF THE FIGURES

The accompanying drawings, which are incorporated in and constitute a part of the description, illustrate several aspects of the present disclosure. A brief description of the drawings is as follows.

DETAILED DESCRIPTION

Figure 1:
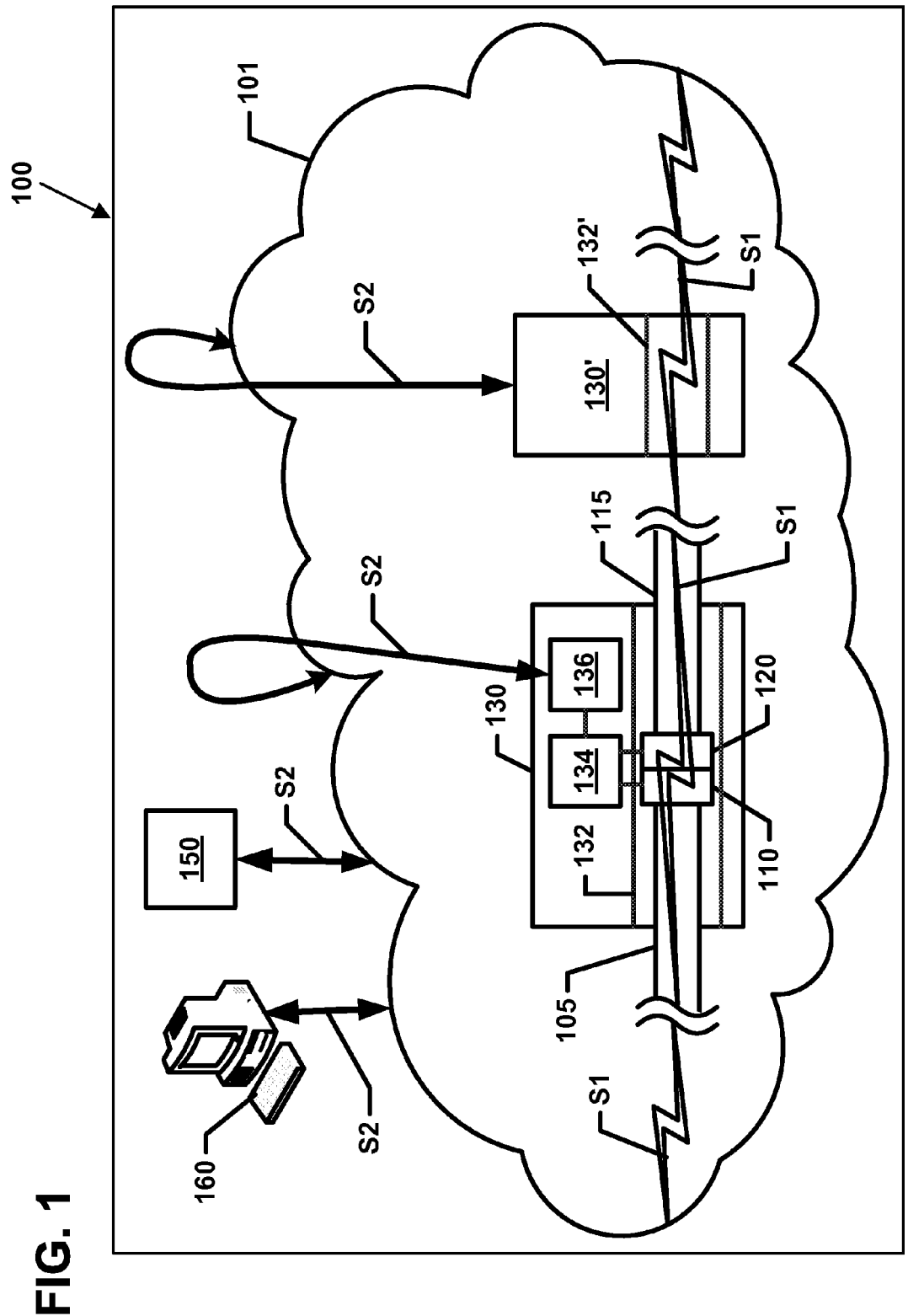
FIG. 1 is a diagram of a portion of an example communications and data management system in accordance with aspects of the present disclosure.

FIG. 1 is a diagram of a portion of an example communications and data management system 100. The example system 100 shown in FIG. 1 includes a part of a communications network 101 along which communications signals S1 pass. In one example implementation, the network 101 can include an Internet Protocol network. In other implementations, however, the communications network 101 may include other types of networks.

The communications network 101 includes interconnected network components (e.g., connector assemblies, inter-networking devices, internet working devices, servers, outlets, and end user equipment (e.g., computers)). In one example implementation, communications signals S1 pass from a computer to a wall outlet to a port of communication panel, to a first port of an inter-networking device, out another port of the inter-networking device, to a port of the same or another communications panel, to a rack mounted server.

The portion of the communications network 101 shown in FIG. 1 includes first and second connector assemblies 130, 130' at which communications signals S1 pass from one portion of the communications network 101 to another portion of the communications network 101. Non-limiting examples of connector assemblies 130, 130' include, for example, rack-mounted connector assemblies (e.g., patch panels, distribution units, and media converters for fiber and copper physical communication media), wall-mounted connector assemblies (e.g., boxes, jacks, outlets, and media converters for fiber and copper physical communication media), and inter-networking devices (e.g., switches, routers, hubs, repeaters, gateways, and access points). In the example shown, the first connector assembly 130 defines at least one port 132 configured to communicatively couple at least a first media segment 105 to at least a second media segment 115 to enable the communication signals S1 to pass between the media segments 105, 115.

The at least one port 132 of the first connector assembly 130 may be directly connected to a port 132' of the second connector assembly 130'. As the term is used herein, the port 132 is directly connected to the port 132' when the communications signals S1 pass between the two ports 132, 132' without passing through an intermediate port. For example, routing a patchcord between port 132 and port 132' directly connects the ports 132, 132'.

The port 132 of the first connector assembly 130 also may be indirectly connected to the port 132' of the second connector assembly 130'. As the term is used herein, the port 132 is indirectly connected to the port 132' when the communications signals S1 pass through an intermediate port when traveling between the ports 132, 132'. For example, in one implementation, the communications signals S1 may be routed over one media segment from the port 132 at the first connector assembly 130 to a port of a third connector assembly at which the media segment is coupled to another media segment that is routed from the port of the third connector assembly to the port 132' of the second connector assembly 130'.

Non-limiting examples of media segments include optical fibers, which carry optical data signals, and electrical conductors (e.g., CAT-5, 6, and 7 twisted-pair cables), which carry electrical data signals. Media segments also can include electrical plugs, fiber optic connectors (e.g., SC, LC, FC, LX.5, or MPO connectors), adapters, media converters, and other physical components terminating to the fibers, conductors, or other such media segments. The techniques described here also can be used with other types of connectors including, for example, BNC connectors, F connectors, DSX jacks and plugs, bantam jacks and plugs.

In the example shown, each media segment 105, 115 is terminated at a plug or connector 110, 120, respectively, which is configured to communicatively connect the media segments 105, 115. For example, in one implementation, the port 132 of the connector assembly 130 can be configured to align ferrules of two fiber optic connectors 110, 120. In another implementation, the port 132 of the connector assembly 130 can be configured to electrically connect an electrical plug with an electrical socket (e.g., a jack). In yet another implementation, the port 132 can include a media converter configured to connect an optical fiber to an electrical conductor.

In accordance with some aspects, the connector assembly 130 does not actively manage (e.g., is passive with respect to) the communications signals S1 passing through port 132. For example, in some implementations, the connector assembly 130 does not modify the communications signal S1 carried over the media segments 105, 115. Further, in some implementations, the connector assembly 130 does not read, store, or analyze the communications signal S1 carried over the media segments 105, 115.

In accordance with aspects of the disclosure, the communications and data management system 100 also provides physical layer information (PLI) functionality as well as physical layer management (PLM) functionality. As the term is used herein, "PLI functionality" refers to the ability of a physical component or system to identify or otherwise associate physical layer information with some or all of the physical components used to implement the physical layer of the system. As the term is used herein, "PLM functionality" refers to the ability of a component or system to manipulate or to enable others to manipulate the physical components used to implement the physical layer of the system (e.g., to track what is connected to each component, to trace connections that are made using the components, or to provide visual indications to a user at a selected component).

As the term is used herein, "physical layer information" refers to information about the identity, attributes, and/or status of the physical components used to implement the physical layer of the communications system 101. In accordance with some aspects, physical layer information of the communications system 101 can include media information, device information, and location information.

As the term is used herein, "media information" refers to physical layer information pertaining to cables, plugs, connectors, and other such media segments. In accordance with some aspects, the media information is stored on or in the media segments, themselves. In accordance with other aspects, the media information can be stored at one or more data repositories for the communications system, either alternatively or in addition to the media, themselves. Non-limiting examples of media information include a part number, a serial number, a plug or other connector type, a conductor or fiber type, a cable or fiber length, cable polarity, a cable or fiber pass-through capacity, a date of manufacture, a manufacturing lot number, information about one or more visual attributes of physical communication media (e.g., information about the color or shape of the physical communication media or an image of the physical communication media), and an insertion count (i.e., a record of the number of times the media segment has been connected to another media segment or network component). Media information also can include testing or media quality or performance information. The testing or media quality or performance information, for example, can be the results of testing that is performed when a particular segment of media is manufactured.

As the term is used herein, "device information" refers to physical layer information pertaining to the communications panels, inter-networking devices, media converters, computers, servers, wall outlets, and other physical communications devices to which the media segments attach. In accordance with some aspects, the device information is stored on or in the devices, themselves. In accordance with other aspects, the device information can be stored at one or more data repositories for the communications system, either alternatively or in addition to the devices, themselves. Non-limiting examples of device information include a device identifier, a device type, port priority data (that associates a priority level with each port), and port updates (described in more detail herein).

As the term is used herein, "location information" refers to physical layer information pertaining to a physical layout of a building or buildings in which the network 101 is deployed. Location information also can include information indicating where each communications device, media segment, network component, or other component that is physically located within the building. In accordance with some aspects, the location information of each system component is stored on or in the respective component. In accordance with other aspects, the location information can be stored at one or more data repositories for the communications system, either alternatively or in addition to the system components, themselves.

In accordance with some aspects, one or more of the components of the communications network 101 is configured to store physical layer information pertaining to the component as will be disclosed in more detail herein. In FIG. 1, the connectors 110, 120, the media segments 105, 115, and/or the connector assemblies 130, 130' may store physical layer information. For example, in FIG. 1, each connector 110, 120 may store information pertaining to itself (e.g., type of connector, data of manufacture, etc.) and/or to the respective media segment 105, 115 (e.g., type of media, test results, etc.).

In another example implementation, the media segments 105, 115 or connectors 110, 120 may store media information that includes a count of the number of times that the media segment (or connector) has been inserted into port 132. In such an example, the count stored in or on the media segment is updated each time the segment (or plug or connector) is inserted into port 132. This insertion count value can be used, for example, for warranty purposes (e.g., to determine if the connector has been inserted more than the number of times specified in the warranty) or for security purposes (e.g., to detect unauthorized insertions of the physical communication media).

In accordance with certain aspects, one or more of the components of the communications network 101 also can read the physical layer information from one or more media segments retained thereat. In certain implementations, one or more network components includes a media reading interface that is configured to read physical layer information stored on or in the media segments or connectors attached thereto. For example, in one implementation, the connector assembly 130 includes a media reading interface 134 that can read media information stored on the media cables 105, 115 retained within the port 132. In another implementation, the media reading interface 134 can read media information stored on the connectors or plugs 110, 120 terminating the cables 105, 115, respectively.

In some implementations, some types of physical layer information can be obtained by the connector assembly 130 from a user at the connector assembly 130 via a user interface (e.g., a keypad, a scanner, a touch screen, buttons, etc.). The connector assembly 130 can provide the physical layer information obtained from the user to other devices or systems that are coupled to the network 101 (as described in more detail herein). In other implementations, some or all physical layer information can be obtained by the connector assembly 130 from other devices or systems that are coupled to the network 101. For example, physical layer information pertaining to media that is not configured to store such information can be entered manually into another device or system that is coupled to the network 101 (e.g., at the connector assembly 130, at the computer 160, or at the aggregation point 150).

In some implementations, some types of non-physical layer information (e.g., network information) can be obtained by one network component from other devices or systems that are coupled to the network 101. For example, the connector assembly 130 may pull non-physical layer information from one or more components of the network 101. In other implementations, the non-physical layer information can be obtained by the connector assembly 130 from a user at the connector assembly 130.

In accordance with some aspects of the disclosure, the physical layer information read by a network component may be processed or stored at the component. For example, in certain implementations, the first connector assembly 130 shown in FIG. 1 is configured to read physical layer information stored on the connectors 110, 120 and/or on the media segments 105, 115 using media reading interface 134. Accordingly, in FIG. 1, the first connector assembly 130 may store not only physical layer information about itself (e.g., the total number of available ports at that assembly 130, the number of ports currently in use, etc.), but also physical layer information about the connectors 110, 120 inserted at the ports and/or about the media segments 105, 115 attached to the connectors 110, 120.

In some implementations, the connector assembly 130 is configured to add, delete, and/or change the physical layer information stored in or on the segment of physical communication media 105, 115 (i.e., or the associated connectors 110, 120). For example, in some implementations, the media information stored in or on the segment of physical communication media 105, 115 can be updated to include the results of testing that is performed when a segment of physical media is installed or otherwise checked. In other implementations, such testing information is supplied to the aggregation point 150 for storage and/or processing. In some implementations, modification of the physical layer information does not affect the communications signals S1 passing through the connector assembly 130.

In other implementations, the physical layer information obtained by the media reading interface (e.g., interface 134 of FIG. 1) may be communicated (see PLI signals S2) over the network 101 for processing and/or storage. The components of the communications network 101 are connected to one or more aggregation devices 150 (described in greater detail herein) and/or to one or more computing systems 160. For example, in the implementation shown in FIG. 1, each connector assembly 130 includes a PLI port 136 that is separate from the "normal" ports 132 of the connector assembly 130. Physical layer information is communicated between the connector assembly 130 and the network 101 through the PLI port 136. In the example shown in FIG. 1, the connector assembly 130 is connected to a representative aggregation device 150, a representative computing system 160, and to other components of the network 101 (see looped arrow) via the PLI port 136.

The physical layer information is communicated over the network 101 just like any other data that is communicated over the network 101, while at the same time not affecting the communication signals S1 that pass through the connector assembly 130 on the normal ports 132. Indeed, in some implementations, the physical layer information may be communicated as one or more of the communication signals S1 that pass through the normal ports 132 of the connector assemblies 130, 130'. For example, in one implementation, a media segment may be routed between the PLI port 136 and one of the "normal" ports 132. In such an implementation, the physical layer information may be passed along the communications network 101 to other components of the communications network 101 (e.g., to the one or more aggregation points 150 and/or to the one or more computer systems 160). By using the network 101 to communicate physical layer information pertaining to it, an entirely separate network need not be provided and maintained in order to communicate such physical layer information.

In other implementations, however, the communications network 101 includes a data network along which the physical layer information described above is communicated. At least some of the media segments and other components of the data network may be separate from those of the communications network 101 to which such physical layer information pertains. For example, in some implementations, the first connector assembly 130 may include a plurality of fiber optic adapters defining ports at which connectorized optical fibers are optically coupled together to create an optical path for communications signals S1. The first connector assembly 130 also may include one or more electrical cable ports at which the physical layer information (see PLI signals S2) are passed to other parts of the data network. (e.g., to the one or more aggregation points 150 and/or to the one or more computer systems 160).

Figure 2:
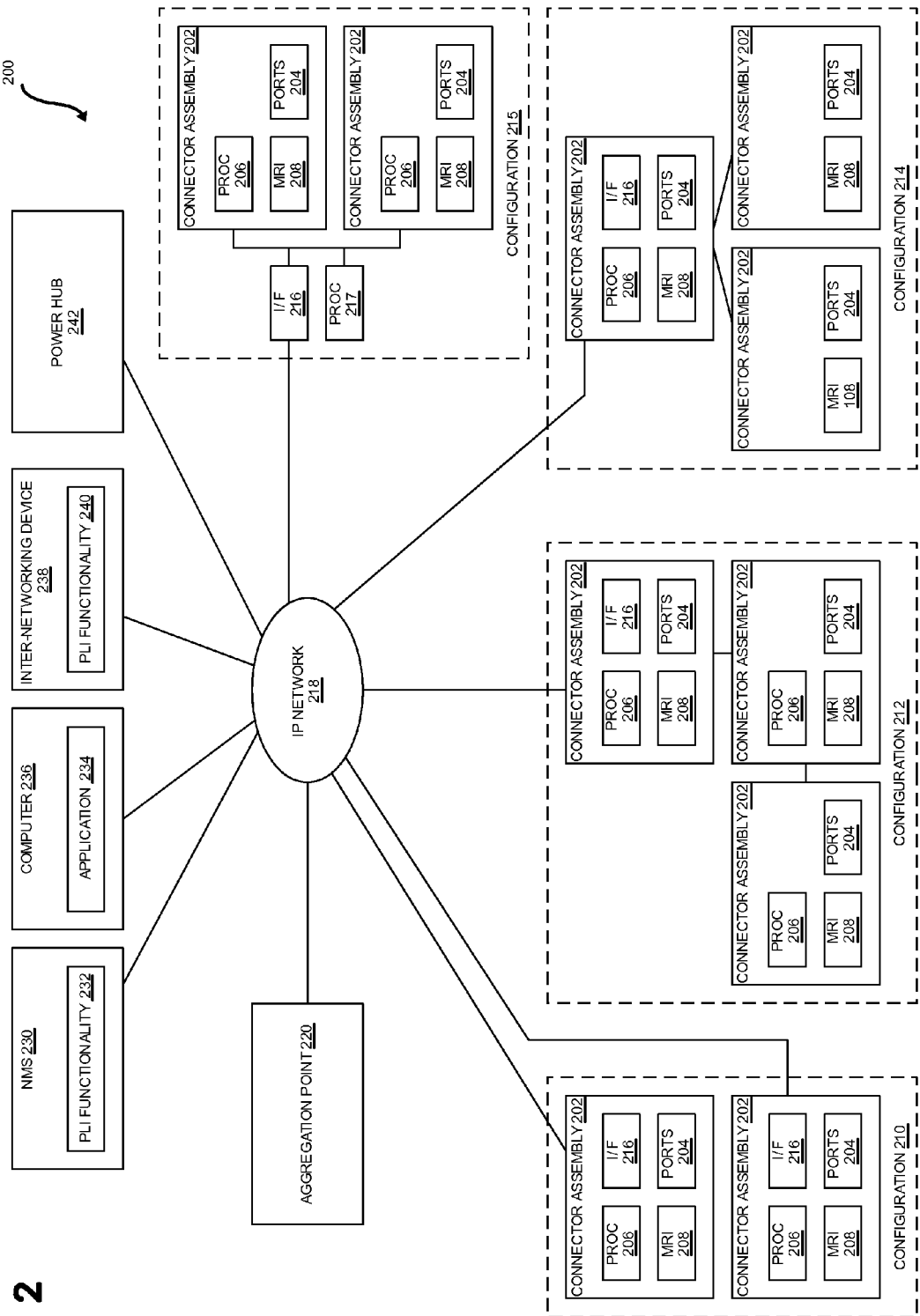
FIG. 2 is a block diagram of one implementation of a communications management system that includes PLI functionality as well as PLM functionality in accordance with aspects of the present disclosure.

FIG. 2 is a block diagram of one example implementation of a communications management system 200 that includes PLI functionality as well as PLM functionality. The management system 200 comprises a plurality of connector assemblies 202. The system 200 includes one or more connector assemblies 202 connected to an IP network 218. The connector assemblies 202 shown in FIG. 2 illustrate various implementations of the connector assembly 130 of FIG. 1.

Each connector assembly 202 includes one or more ports 204, each of which is used to connect two or more segments of physical communication media to one another (e.g., to implement a portion of a logical communication link for communication signals S1 of FIG. 1). At least some of the connector assemblies 202 are designed for use with segments of physical communication media that have physical layer information stored in or on them. The physical layer information is stored in or on the segment of physical communication media in a manner that enables the stored information, when the segment is attached to a port 204, to be read by a programmable processor 206 associated with the connector assembly 202.

In the particular implementation shown in FIG. 2, each of the ports 204 of the connector assemblies 202 comprises a respective media reading interface 208 via which the respective programmable processor 206 is able to determine if a physical communication media segment is attached to that port 204 and, if one is, to read the physical layer information stored in or on the attached segment (if such media information is stored therein or thereon). The programmable processor 206 associated with each connector assembly 202 is communicatively coupled to each of the media reading interfaces 208 using a suitable bus or other interconnect (not shown).

In the particular implementation shown in FIG. 2, four example types of connector assembly configurations are shown. In the first connector assembly configuration 210 shown in FIG. 2, each connector assembly 202 includes its own respective programmable processor 206 and its own respective network interface 216 that is used to communicatively couple that connector assembly 202 to an Internet Protocol (IP) network 218.

In the second type of connector assembly configuration 212, a group of connector assemblies 202 are physically located near each other (e.g., in a bay or equipment closet). Each of the connector assemblies 202 in the group includes its own respective programmable processor 206. However, in the second connector assembly configuration 212, some of the connector assemblies 202 (referred to here as "interfaced connector assemblies") include their own respective network interfaces 216 while some of the connector assemblies 202 (referred to here as "non-interfaced connector assemblies") do not. The non-interfaced connector assemblies 202 are communicatively coupled to one or more of the interfaced connector assemblies 202 in the group via local connections. In this way, the non-interfaced connector assemblies 202 are communicatively coupled to the IP network 218 via the network interface 216 included in one or more of the interfaced connector assemblies 202 in the group. In the second type of connector assembly configuration 212, the total number of network interfaces 216 used to couple the connector assemblies 202 to the IP network 218 can be reduced. Moreover, in the particular implementation shown in FIG. 2, the non-interfaced connector assemblies 202 are connected to the interfaced connector assembly 202 using a daisy chain topology (though other topologies can be used in other implementations and embodiments).

In the third type of connector assembly configuration 214, a group of connector assemblies 202 are physically located near each other (e.g., within a bay or equipment closet). Some of the connector assemblies 202 in the group (also referred to here as "master" connector assemblies 202) include both their own programmable processors 206 and network interfaces 216, while some of the connector assemblies 202 (also referred to here as "slave" connector assemblies 202) do not include their own programmable processors 206 or network interfaces 216. Each of the slave connector assemblies 202 is communicatively coupled to one or more of the master connector assemblies 202 in the group via one or more local connections. The programmable processor 206 in each of the master connector assemblies 202 is able to carry out the PLM functions for both the master connector assembly 202 of which it is a part and any slave connector assemblies 202 to which the master connector assembly 202 is connected via the local connections. As a result, the cost associated with the slave connector assemblies 202 can be reduced. In the particular implementation shown in FIG. 2, the slave connector assemblies 202 are connected to a master connector assembly 202 in a star topology (though other topologies can be used in other implementations and embodiments).

Each programmable processor 206 is configured to execute software or firmware that causes the programmable processor 206 to carry out various functions described below. Each programmable processor 206 also includes suitable memory (not shown) that is coupled to the programmable processor 206 for storing program instructions and data. In general, the programmable processor 206 determines if a physical communication media segment is attached to a port 204 with which that processor 206 is associated and, if one is, to read the identifier and attribute information stored in or on the attached physical communication media segment (if the segment includes such information stored therein or thereon) using the associated media reading interface 208.

In the fourth type of connector assembly configuration 215, a group of connector assemblies 202 are housed within a common chassis or other enclosure. Each of the connector assemblies 202 in the configuration 215 includes their own programmable processors 206. In the context of this configuration 215, the programmable processors 206 in each of the connector assemblies are "slave" processors 206. Each of the slave programmable processor 206 is also communicatively coupled to a common "master" programmable processor 217 (e.g., over a backplane included in the chassis or enclosure). The master programmable processor 217 is coupled to a network interface 216 that is used to communicatively couple the master programmable processor 217 to the IP network 218.

In this configuration 215, each slave programmable processor 206 is configured to determine if physical communication media segments are attached to its port 204 and to read the physical layer information stored in or on the attached physical communication media segments (if the attached segments have such information stored therein or thereon) using the associated media reading interfaces 208. The physical layer information is communicated from the slave programmable processor 206 in each of the connector assemblies 202 in the chassis to the master processor 217. The master processor 217 is configured to handle the processing associated with communicating the physical layer information read from by the slave processors 206 to devices that are coupled to the IP network 218.

The system 200 includes functionality that enables the physical layer information that the connector assemblies 202 capture to be used by application-layer functionality outside of the traditional physical-layer management application domain. That is, the physical layer information is not retained in a PLM "island" used only for PLM purposes but is instead made available to other applications. In the particular implementation shown in FIG. 2, the management system 200 includes an aggregation point 220 that is communicatively coupled to the connector assemblies 202 via the IP network 218.

The aggregation point 220 includes functionality that obtains physical layer information from the connector assemblies 202 (and other devices) and stores the physical layer information in a data store. The aggregation point 220 can be used to receive physical layer information from various types of connector assemblies 202 that have functionality for automatically reading information stored in or on the segment of physical communication media. Also, the aggregation point 220 and aggregation functionality 224 can be used to receive physical layer information from other types of devices that have functionality for automatically reading information stored in or on the segment of physical communication media. Examples of such devices include end-user devices—such as computers, peripherals (e.g., printers, copiers, storage devices, and scanners), and IP telephones—that include functionality for automatically reading information stored in or on the segment of physical communication media.

The aggregation point 220 also can be used to obtain other types of physical layer information. For example, in this implementation, the aggregation point 220 also obtains information about physical communication media segments that is not otherwise automatically communicated to an aggregation point 220. This information can be provided to the aggregation point 220, for example, by manually entering such information into a file (e.g., a spreadsheet) and then uploading the file to the aggregation point 220 (e.g., using a web browser) in connection with the initial installation of each of the various items. Such information can also, for example, be directly entered using a user interface provided by the aggregation point 220 (e.g., using a web browser).

The aggregation point 220 also includes functionality that provides an interface for external devices or entities to access the physical layer information maintained by the aggregation point 220. This access can include retrieving information from the aggregation point 220 as well as supplying information to the aggregation point 220. In this implementation, the aggregation point 220 is implemented as "middleware" that is able to provide such external devices and entities with transparent and convenient access to the PLI maintained by the access point 220. Because the aggregation point 220 aggregates PLI from the relevant devices on the IP network 218 and provides external devices and entities with access to such PLI, the external devices and entities do not need to individually interact with all of the devices in the IP network 218 that provide PLI, nor do such devices need to have the capacity to respond to requests from such external devices and entities.

For example, as shown in FIG. 2, a network management system (NMS) 230 includes PLI functionality 232 that is configured to retrieve physical layer information from the aggregation point 220 and provide it to the other parts of the NMS 230 for use thereby. The NMS 230 uses the retrieved physical layer information to perform one or more network management functions. The NMS 230 communicates with the aggregation point 220 over the IP network 218.

As shown in FIG. 2, an application 234 executing on a computer 236 can also use the API implemented by the aggregation point 220 to access the PLI information maintained by the aggregation point 220 (e.g., to retrieve such information from the aggregation point 220 and/or to supply such information to the aggregation point 220). The computer 236 is coupled to the IP network 218 and accesses the aggregation point 220 over the IP network 218.

In the example shown in FIG. 2, one or more inter-networking devices 238 used to implement the IP network 218 include physical layer information (PLI) functionality 240. The PLI functionality 240 of the inter-networking device 238 is configured to retrieve physical layer information from the aggregation point 220 and use the retrieved physical layer information to perform one or more inter-networking functions. Examples of inter-networking functions include Layer 1, Layer 2, and Layer 3 (of the OSI model) inter-networking functions such as the routing, switching, repeating, bridging, and grooming of communication traffic that is received at the inter-networking device.

The aggregation point 220 can be implemented on a standalone network node (e.g., a standalone computer running appropriate software) or can be integrated along with other network functionality (e.g., integrated with an element management system or network management system or other network server or network element). Moreover, the functionality of the aggregation point 220 can be distribute across many nodes and devices in the network and/or implemented, for example, in a hierarchical manner (e.g., with many levels of aggregation points). The IP network 218 can include one or more local area networks and/or wide area networks (e.g., the Internet). As a result, the aggregation point 220, NMS 230, and computer 236 need not be located at the same site as each other or at the same site as the connector assemblies 202 or the inter-networking devices 238.

Also, power can be supplied to the connector assemblies 202 using conventional "Power over Ethernet" techniques specified in the IEEE 802.3af standard, which is hereby incorporated herein by reference. In such an implementation, a power hub 242 or other power supplying device (located near or incorporated into an inter-networking device that is coupled to each connector assembly 202) injects DC power onto one or more of the wires (also referred to here as the "power wires") included in the copper twisted-pair cable used to connect each connector assembly 202 to the associated inter-networking device.

Figure 3:
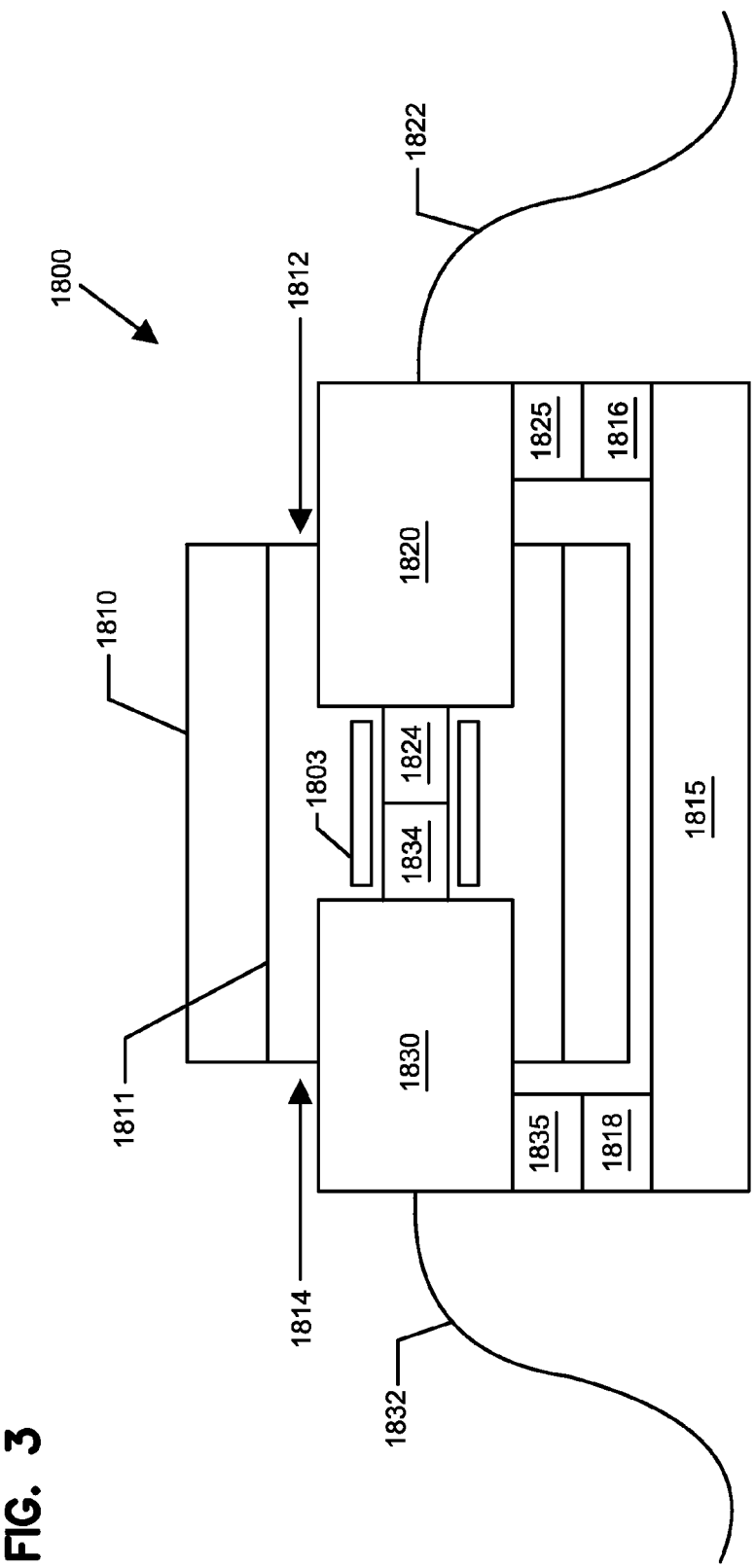
FIG. 3 is a block diagram of one high-level example of a port and media reading interface that are suitable for use in the management system of FIG. 2 in accordance with aspects of the present disclosure.
Figure 4:
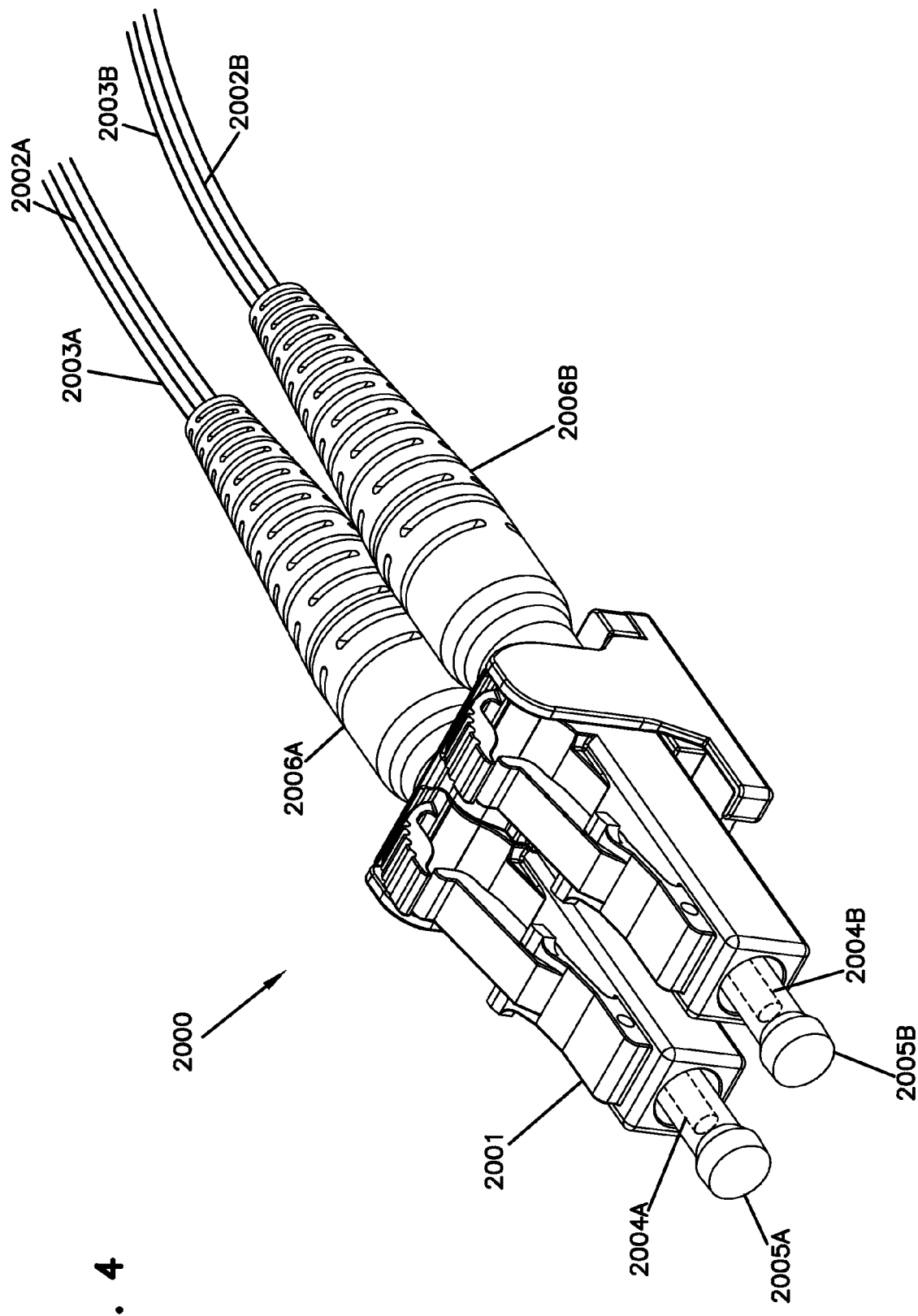
FIG. 4 is a top perspective view of an example connector arrangement configured in accordance with the principles of the present disclosure.

FIG. 3 is a schematic diagram of one example connection system 1800 including a connector assembly 1810 configured to collect physical layer information from at least one segment of physical communications media. The example connector assembly 1820 of FIG. 3 is configured to connect segments of optical physical communications media in a physical layer management system. The connector assembly 1800 includes a fiber optic adapter 1810 defining at least one connection opening 1811 having a first port 1812 and a second port 1814. A sleeve (e.g., a split sleeve) 1803 is arranged within the connection opening 1811 of the adapter 1810 between the first and second ports 1812, 1814. Each port 1812, 1814 is configured to receive a connector arrangement as will be described in greater detail herein.

A first example segment of optical physical communication media includes a first connector arrangement 1820 and a second example segment of optical physical communication media includes a second connector arrangement 1830. The first connector arrangement 1820 is plugged into the first port 1812 of the adapter 1810 and the second connector arrangement 1830 is plugged into the second port 1814 of the adapter 1810. Each fiber connector arrangement 1820, 1830 includes a ferrule 1824, 1834 that terminates an optical fiber 1822, 1832, respectively.

The ferrules 1824, 1834 of the connector arrangements 1820, 1830 are aligned by the sleeve 1803 when the connector arrangements 1820, 1830 are inserted into the adapter 1810. Aligning the ferrules 1824, 1834 provides optical coupling between the optical fibers 1822, 1832. Each segment of optical physical communication media (e.g., each optical fiber 1822, 1832) carries communication signals (e.g., communications signals S1 of FIG. 1). The aligned ferrules 1824, 1834 of the connector arrangements 1820, 1830 create an optical path along which the communication signals may be carried.

In some implementations, the first connector arrangement 1820 may include a storage device 1825 that is configured to store physical layer information (e.g., an identifier and/or attribute information) pertaining to the segment of physical communications media (e.g., the first connector arrangement 1825 and/or the fiber optic cable terminated thereby). In some embodiments, the connector arrangement 1830 also includes a storage device 1835 that is configured to store information (e.g., an identifier and/or attribute information) pertaining to the second connector arrangement 1835.

In one implementation, each of the storage devices 1825, 1835 is implemented using an EEPROM (e.g., a PCB surface-mount EEPROM). In other implementations, the storage devices 1825, 1835 are implemented using other non-volatile memory device. Each storage device 1825, 1835 is arranged and configured so that it does not interfere or interact with the communications signals communicated over the media segments 1822, 1832.

The adapter 1810 is coupled to at least a first media reading interface 1816. In certain implementations, the adapter 1810 also is coupled to a second media interface 1818. In some implementations, the adapter 1810 is coupled to multiple media reading interfaces. In certain embodiments, the adapter 1810 includes a media reading interface for each port defined by the adapter 1810. In other embodiments, the adapter 1810 includes a media reading interface for each connection opening 1811 defined by the adapter 1810. In still other embodiments, the adapter 1810 includes a media reading interface for each connector arrangement that the adapter 1810 is configured to receive. In still other embodiments, the adapter 1810 includes a media reading interface for only a portion of the connector arrangement that the adapter 1810 is configured to receive.

In some implementations, the first media reading interface 1816 is mounted to a printed circuit board 1815. In the example shown, the first media reading interface 1816 of the printed circuit board 1815 is associated with the first port 1812 of the adapter 1810. In some embodiments, the printed circuit board 1815 also can include the second media reading interface 1818. In one such embodiment, the second media reading interface 1818 is associated with the second port 1814 of the adapter 1810.

The printed circuit board 1815 of the connector assembly 1800 can be communicatively connected to one or more programmable processors and/or to one or more network interfaces. The network interface may be configured to send the physical layer information to the data network (e.g., see signals S2 of FIG. 1). In one implementation, one or more such processors and interfaces can be arranged as components on the printed circuit board 1815. In another embodiment, one or more such processor and interfaces can be arranged on a separate circuit board that is coupled to the printed circuit board 1815. For example, the printed circuit board 1815 can couple to other circuit boards via a card edge type connection, a connector-to-connector type connection, a cable connection, etc.

When the first connector arrangement 1820 is received in the first port 1812 of the adapter 1810, the first media reading interface 1816 is configured to enable reading (e.g., by the processor) of the information stored in the storage device 1825. The information read from the first connector arrangement 1820 can be transferred through the printed circuit board 1815 to a physical layer management network, e.g., network 101 of FIG. 1, network 218 of FIG. 2, etc. When the second connector arrangement 1830 is received in the second port 1814 of the adapter 1810, the second media reading interface 1818 is configured to enable reading (e.g., by the processor) of the information stored in the storage device 1835. The information read from the second connector arrangement 1830 can be transferred through the printed circuit board 1815 to the physical layer management network.

In some such implementations, the storage devices 1825, 1835 and the media reading interfaces 1816, 1818 each comprise three (3) leads—a power lead, a ground lead, and a data lead. The three leads of the storage devices 1825, 1835 come into electrical contact with three (3) corresponding leads of the media reading interfaces 1816, 1818 when the corresponding media segment is inserted in the corresponding port. In certain example implementations, a two-line interface is used with a simple charge pump. In still other implementations, additional leads can be provided (e.g., for potential future applications). Accordingly, the storage devices 1825, 1835 and the media reading interfaces 1816, 1818 may each include four (4) leads, five (5) leads, six (6) leads, etc.

FIGS. 4-31 provide example implementations of physical layer management networks and components for optical telecommunications applications. FIGS. 4-11 show one example fiber connector arrangement 2000 suitable for use in a physical layer management system (e.g., as one or both of the connector arrangements 1820, 1830 shown in FIG. 3). The fiber connector arrangement 2000 includes at least one connector 2001 configured to receive at least a first optical fiber 2002A and terminate the optical fiber at a ferrule 2004A. The fiber 2002A may include sheathing (e.g., a buffer tube, a jacket, and/or one or more strength members) 2003A. Initially, the ferrule 2004A can be covered and protected by a dust cap 2005A. A boot 2006A can cover and protect the fiber 2002A as the fiber leaves the connector 2001.

In the example shown, the connector arrangement 2000 is a duplex LC-type connector arrangement 2000. The duplex connector arrangement 2000 includes a second connector 2001 is configured to receive a second optical fiber 2002B and to terminate the second optical fiber at a second ferrule 2004B. A second dust cap 2005B covers the second ferrule 2004B and a second boot 2006B protects the second fiber 2002B as the second fiber 2002B leaves the housing 2001. In other embodiments, however, the connector arrangement 2000 can be configured to terminate greater or fewer optical fibers.

Figure 5:
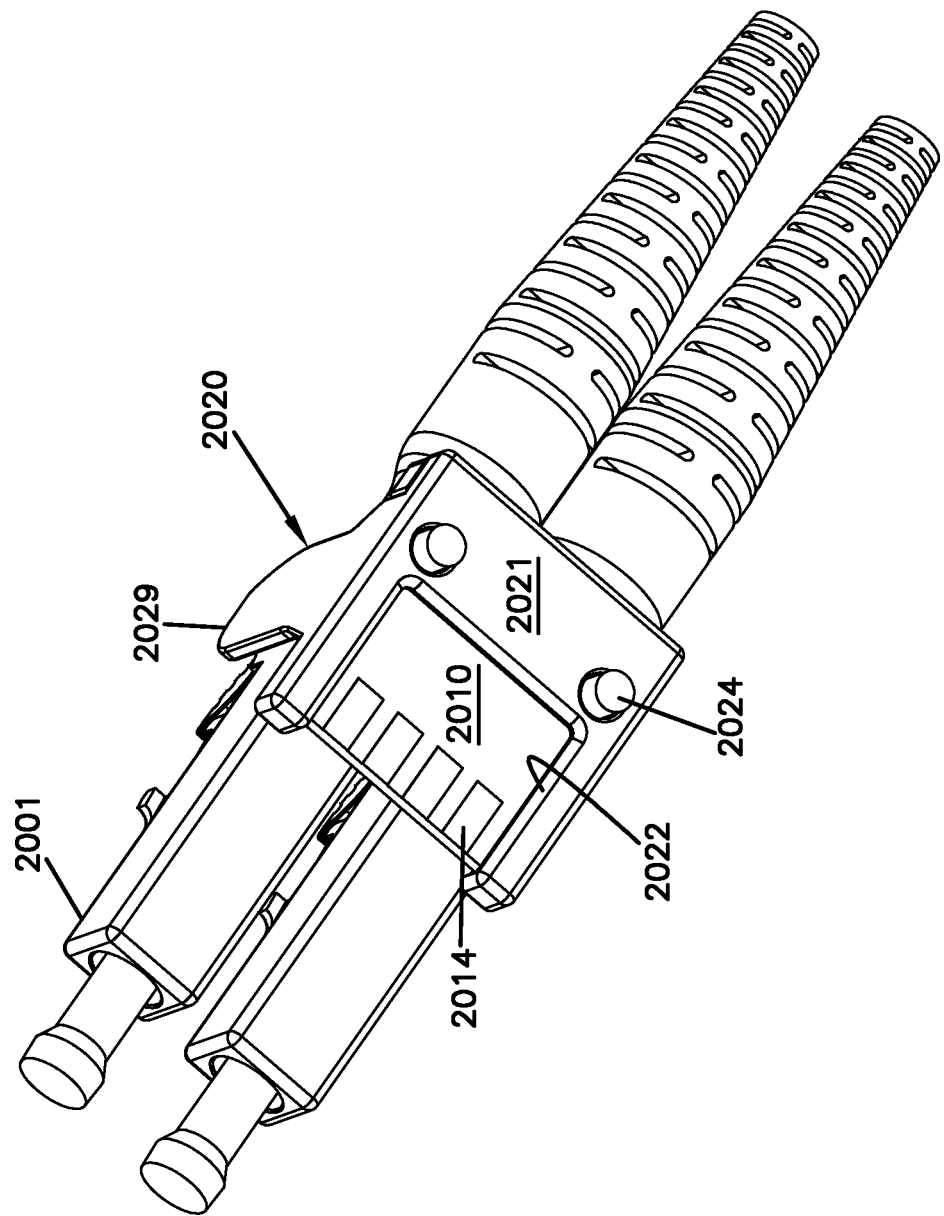
FIG. 5 is a bottom perspective view of the example connector arrangement of FIG. 4.
Figure 6:
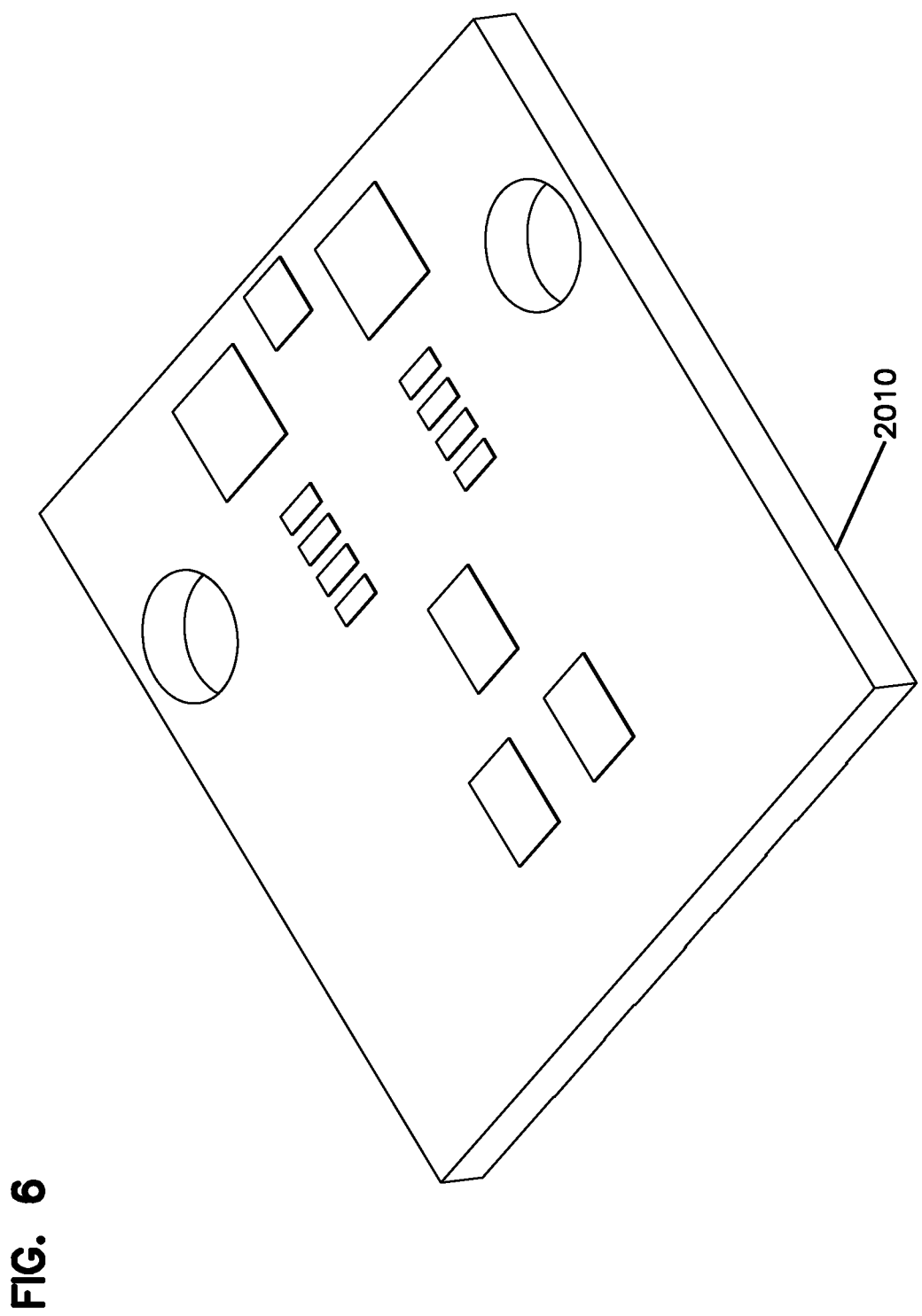
FIG. 6 is a perspective view of an example printed circuit board configured for use with the connector arrangement of FIG. 4 in accordance with the principles of the present disclosure.
Figure 7:
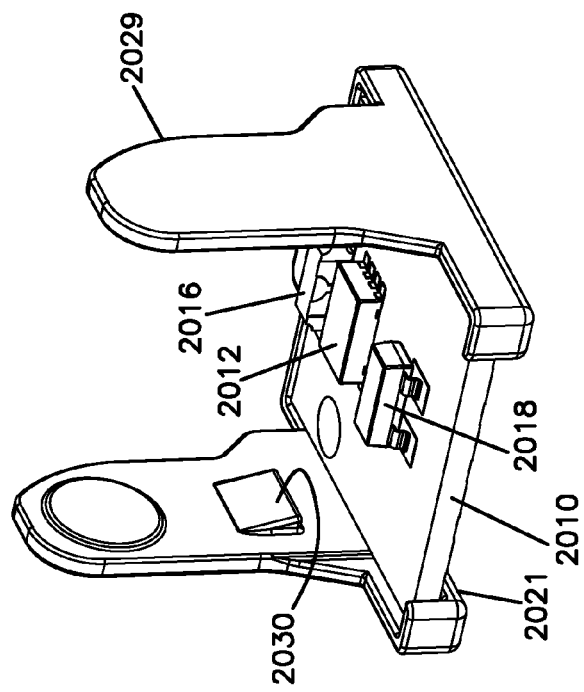
FIG. 7 is a perspective view of an example printed circuit board with components mounted in a carrier in accordance with the principles of the present disclosure.
Figure 10:
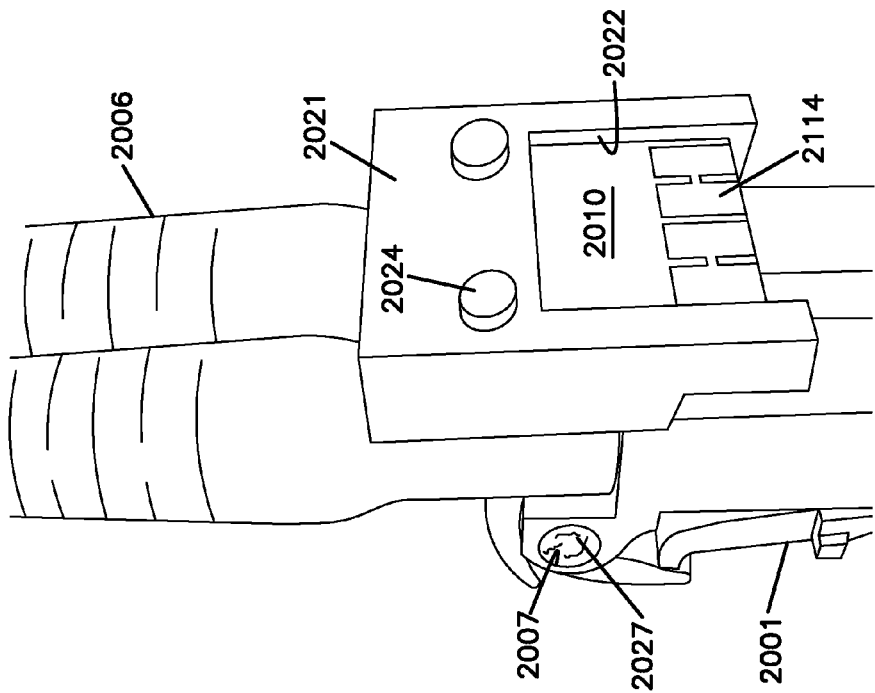
FIG. 10 is a partial perspective view of an example connector arrangement including a printed circuit board coupled to a fiber optic connector via a carrier in accordance with the principles of the present disclosure.
Figure 9:
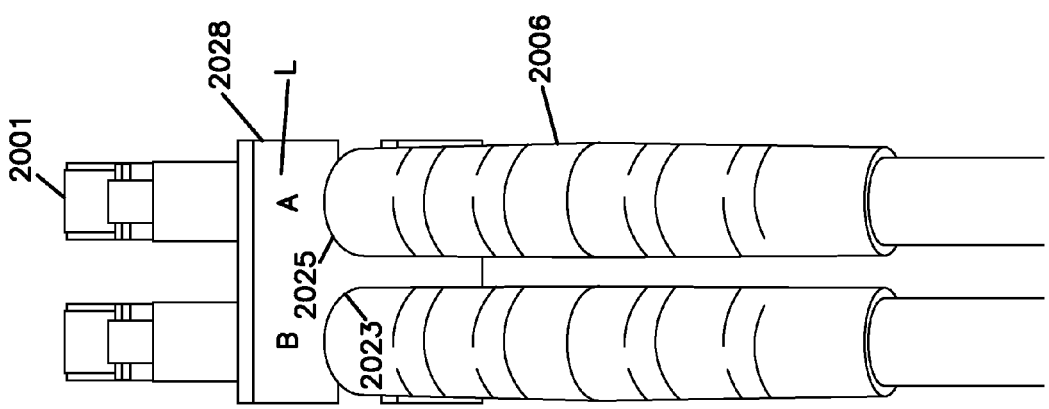
FIG. 9 is a partial end view of an example connector arrangement configured in accordance with the principles of the present disclosure.
Figure 11:
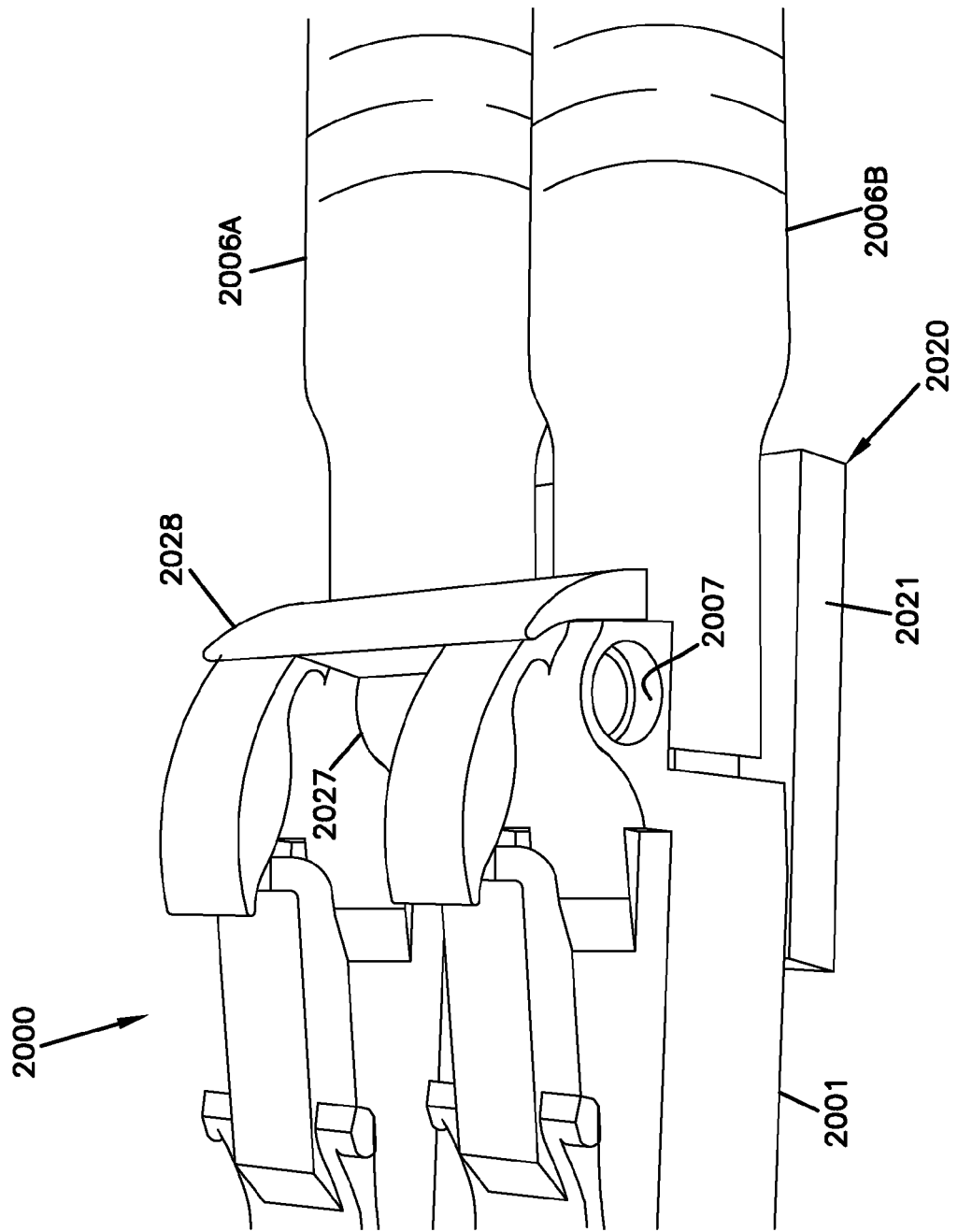
FIG. 11 is a partial side view of an example connector arrangement in accordance with the principles of the present disclosure.
Figure 12:
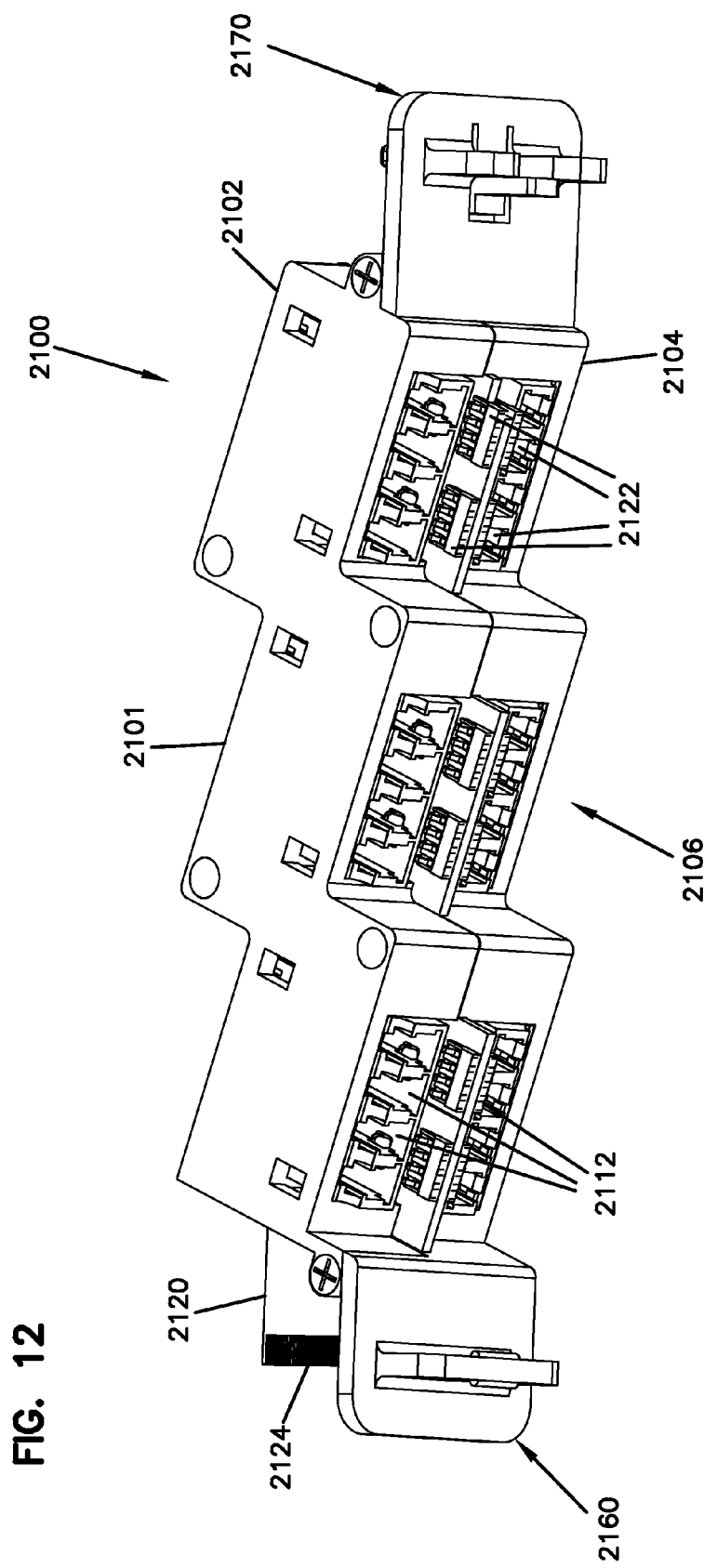
FIG. 12 is a top, front perspective view of an example panel module configured in accordance with the principles of the present disclosure.
Figure 13:
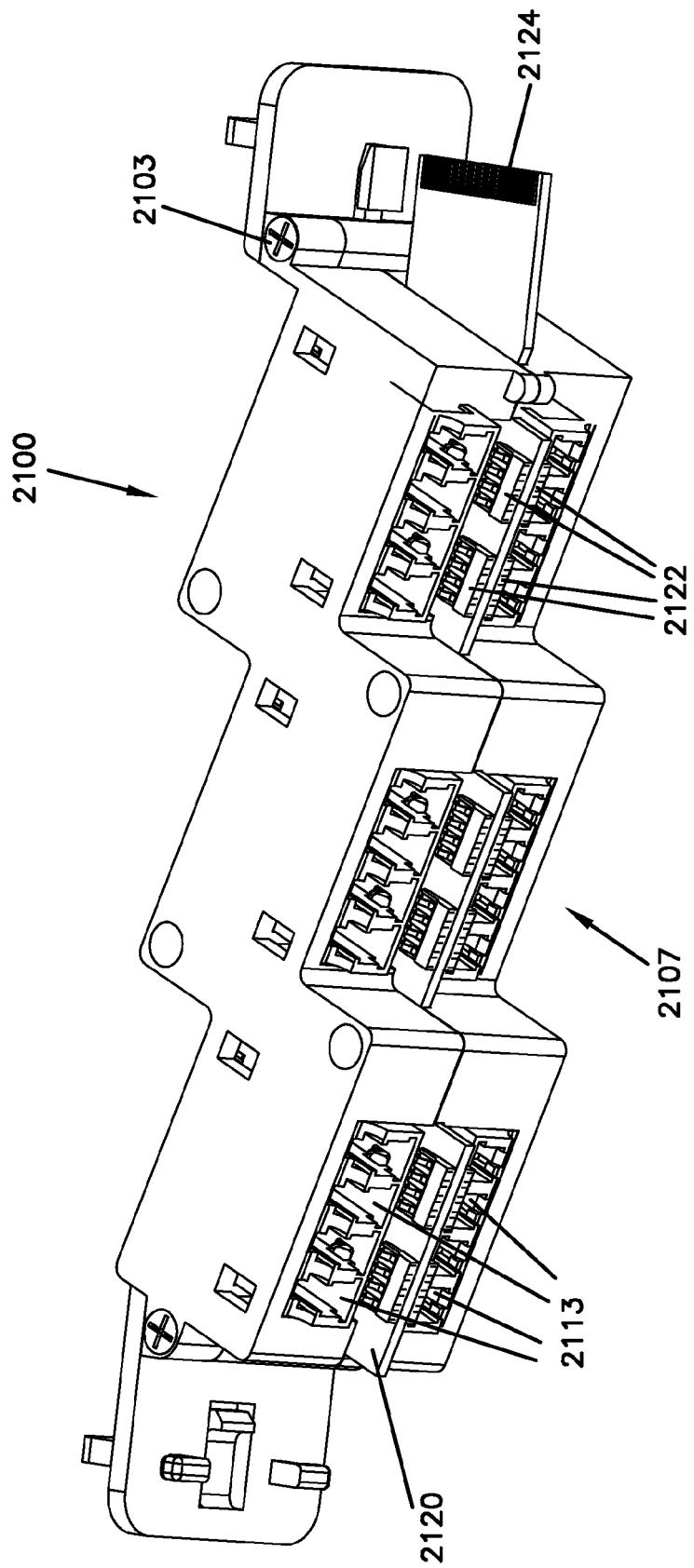
FIG. 13 is a top, rear perspective view of the example panel module of FIG. 12 configured in accordance with the principles of the present disclosure.
Figure 14:
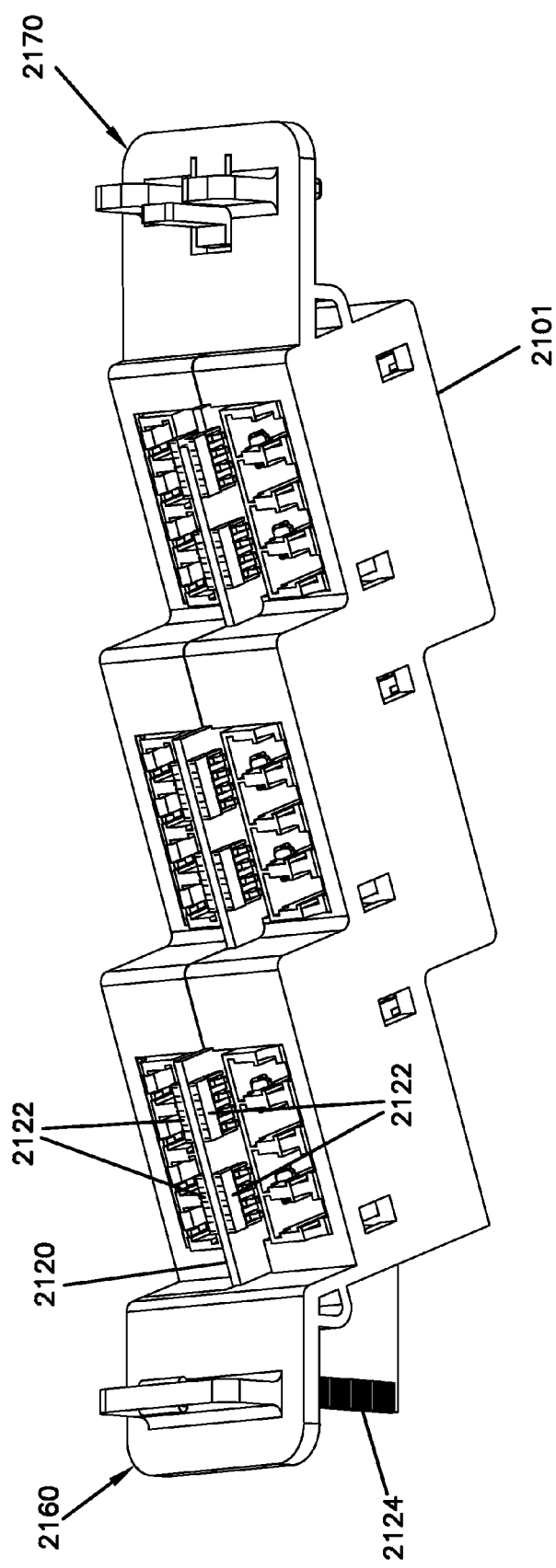
FIG. 14 is a bottom, front perspective view of the example panel module of FIG. 12 configured in accordance with the principles of the present disclosure.
Figure 15:
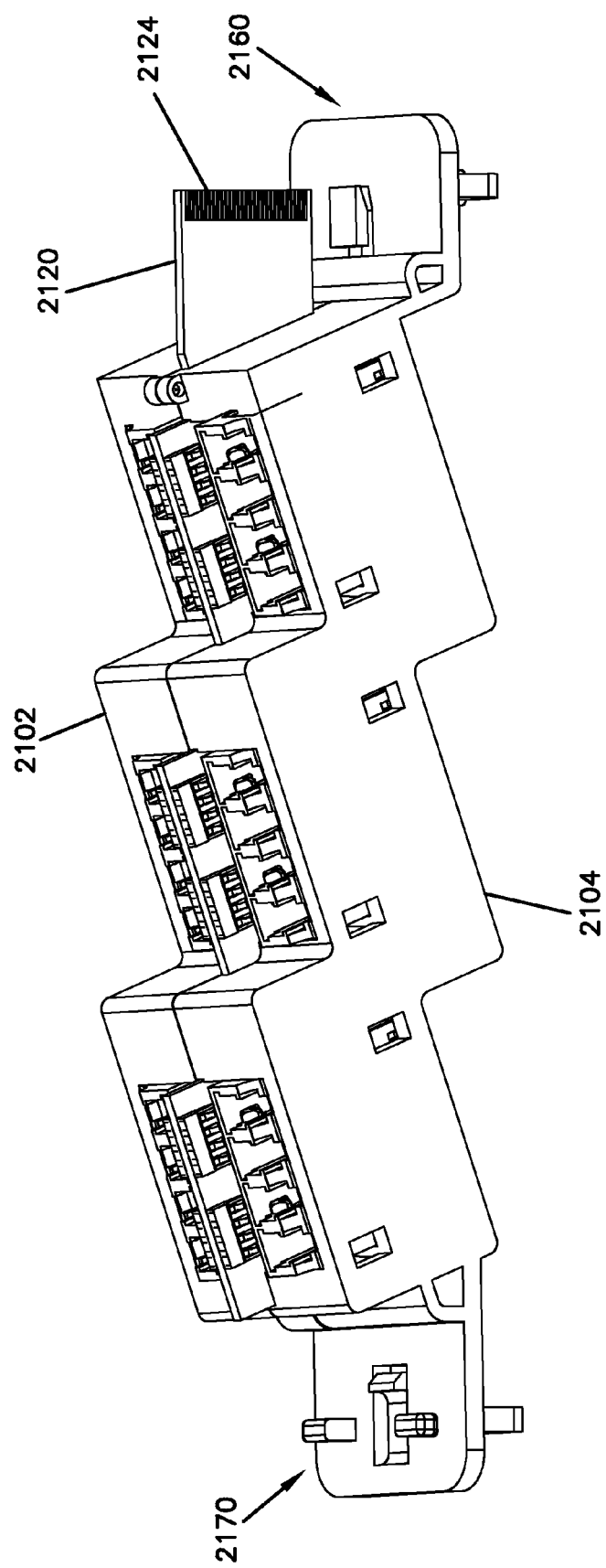
FIG. 15 is a bottom, rear perspective view of the example panel module of FIG. 12 configured in accordance with the principles of the present disclosure.
Figure 16:
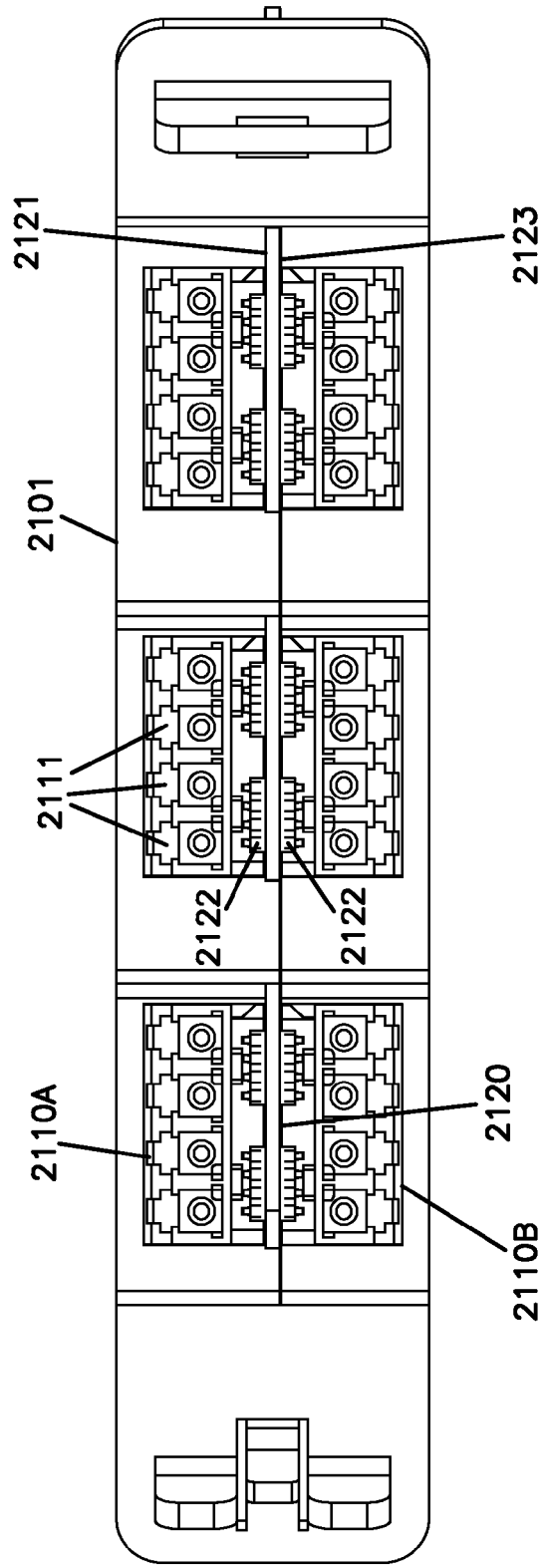
FIG. 16 is a front elevational view of the example panel module of FIG. 12 configured in accordance with the principles of the present disclosure.

The connector arrangement 2000 also includes a storage device 2012 coupled to at least one of the connectors 2001 (see FIGS. 5-7). The connector arrangement 2000 also includes a storage interface 2014. In the example shown, the storage device 2012 and the storage interface 2014 are arranged on a printed circuit board 2010. The storage device 2012 is configured to store physical layer information (e.g., an identifier and/or attribute information) pertaining to the connector arrangement 2000. In one example embodiment, the storage device 2012 includes an EEPROM circuit arranged on the printed circuit board 2010. In other embodiments, however, the storage device 2012 can include any suitable type of memory. The storage interface 2014 is configured to enable the physical layer information to be read from the storage device 2012 by a media reading interface as described herein (e.g., media reading interfaces 1816, 1818 of FIG. 3).

In some embodiments, the connector arrangement 2000 also can include additional components to aid in physical layer management. In one embodiment, the connector arrangement 2000 also can include a communications device 2016 (FIG. 7) that is configured to send and receive communications signals to and from a local source. For example, the communications device 2016 can include an infra-red transceiver that sends and receives infra-red signals. Such a communications device 2016 can enable a technician to read and/or write data to the storage device 2012 using an infra-red wand or probe (e.g., a handheld wand or probe). Accordingly, the technician can access information stored on the connector arrangement 2000 without unplugging the connector arrangement 2000 out of a port of a connection assembly, which will be described in detail herein. Additional components (e.g., a MOSFET circuit) 2018 also can be arranged on the connector arrangement 2000 (e.g., on the printed circuit board 2010) as desired.

In certain embodiments, the storage device 2012 and storage interface 2014 can be arranged on a printed circuit board 2010 that is coupled to at least one of the connectors 2001. In one embodiment, the communications device 2016 also can be arranged on the printed circuit board 2010. In some embodiments, the printed circuit board 2010 is coupled to the connector 2001 by a frame 2020. In accordance with some aspects, the storage device 2012 can be added (i.e., retrofitted) to an existing fiber optic connector, such as an existing LC-style duplex connector, using the frame 2020.

In the example shown, the frame 2020 includes a retainer 2021, in which the printed circuit board 2010 can seat, and a frame body 2022. The frame body 2022 couples to the retainer 2021 at one or more connection points 2024. For example, the frame body 2022 can be glued, melted, or otherwise fastened to the retainer 2021 at these points 2024. The frame body 2022 defines one or more cutouts 2025 sized and shaped to accommodate the connectors 2001. In certain implementations, the frame body 2022 defines a cutout 2025 for each connector 2001 to be held by the frame 2022. In the example shown, the frame includes two cutouts 2025 to hold two connectors 2001. However, in FIG. 8, one of the cutouts 2025 has been removed so that a latch 2030 holding down the storage device 2012 (discussed in more detail herein) is visible. An intermediate wall 2023 extends between the two cutouts 2025 to define separate channels in which the connector holders may be accommodated (see FIGS. 4 and 8).

The frame body 2022 also defines a channel 2026 in which the components (e.g., the storage device 2012) of the printed circuit board 2011 can be accommodated. In some embodiments, the frame 2022 can include a bar or rod 2027 that extends across a top of the frame body 2022 over or through the body 2001 of the connector. In certain embodiments, one or more flanges 2028 can protrude upwardly from the bar 2027. In certain implementations, the bar 2027 includes a flange 2028 for each optical fiber accommodated by the connector arrangement 2000. In one implementation, labels L can be placed on the flanges to identify which optical fiber is which (e.g., see FIG. 9).

Figure 8:
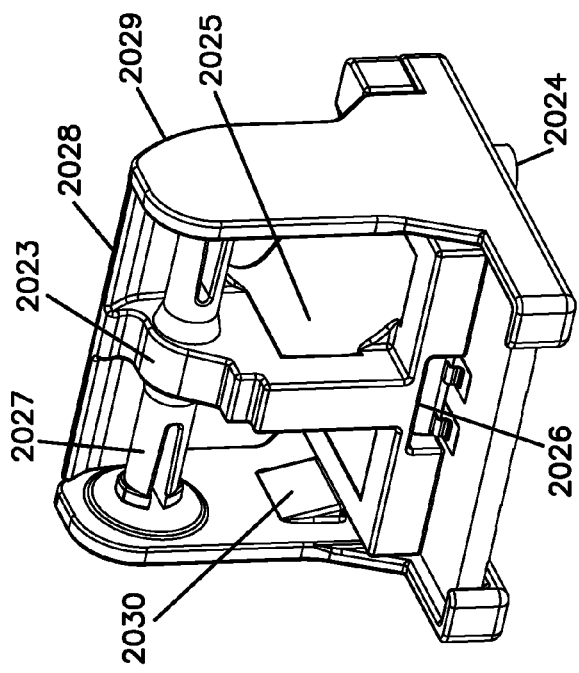
FIG. 8 is a perspective view of an example frame by which a printed circuit board can be coupled to a fiber optic connector in accordance with the principles of the present disclosure.

In some embodiments, the retainer 2021 can include side arms 2029 to increase the connection with the frame body 2022 (e.g. see FIGS. 7-8). For example, in one embodiment, the side arms 2029 can extend upwardly around the outside of at least one of the connectors 2001 and couple to the bar 2027 of the frame body 2022. For example, the bar 2027 can be glued, melted, or otherwise fastened to the side arms 2029. The side arms 2029 also can include a latch 2030 that is configured to hold the frame body 2022 against the printed circuit board 2010. In other embodiments, however, the frame body 2022 can couple to the connectors 2001 without the aid of the side arms 2029. For example, the bar 2027 of the frame body 2022 can be glued, melted, or otherwise fastened to the connectors 2001 (e.g., see FIG. 10). In one embodiment, the bar 2027 extends through a channel 2007 defined in each connector 2001 (e.g., see FIGS. 8 and 10).

FIGS. 12-25 illustrate one example connector assembly that is configured as a panel module 2100. The panel module 2100 includes a housing 2101 defining a longitudinal axis L and having a first side 2106 and a second side 2107 (see FIG. 17). The panel module housing 2101 defines one or more mounting locations 2105 (FIG. 18) at which one or more adapter assemblies 2110 can be mounted. The housing 2101 also is configured to hold at least one printed circuit board 2120 on which at least one media reading interface 2122 is arranged. Each media reading interface 2122 is configured to obtain information stored on a connector arrangement (e.g., connection arrangement 2000 of FIGS. 4-11) that is inserted into a port in one of the adapter assemblies 2110. The printed circuit board 2120 also defines a network interface 2124 that communicatively couples the media reading interface 2122 to a physical layer management network.

In some embodiments, the printed circuit board 2120 includes one media reading interface 2122 for each adapter assembly port in the panel module 2100. In other embodiments, the printed circuit board 2120 includes one media reading interface 2122 for each connector arrangement to be received in the panel module 2100. For example, in some embodiments, if the adapter assembly 2110 is configured to receive a duplex connector arrangement (e.g., connector arrangement 2000 of FIGS. 4-11), then the printed circuit board 2120 will include one media reading interface 2122 for every two adapter assembly ports 2112, 2113.

In some embodiments, the network interface 2124 of the printed circuit board includes a card edge interface defined along one end of the printed circuit board 2120 (e.g., see FIG. 12-15) to connect the printed circuit board 2120 to a physical layer management network. In other embodiments, the network interface 2124 can include a connector interface that is configured to mate with another connector or receptacle. In other embodiments, the network interface 2124 connects to one or more cables (e.g., copper) that connect the printed circuit board 2120 to the physical layer management network.

Figure 17:
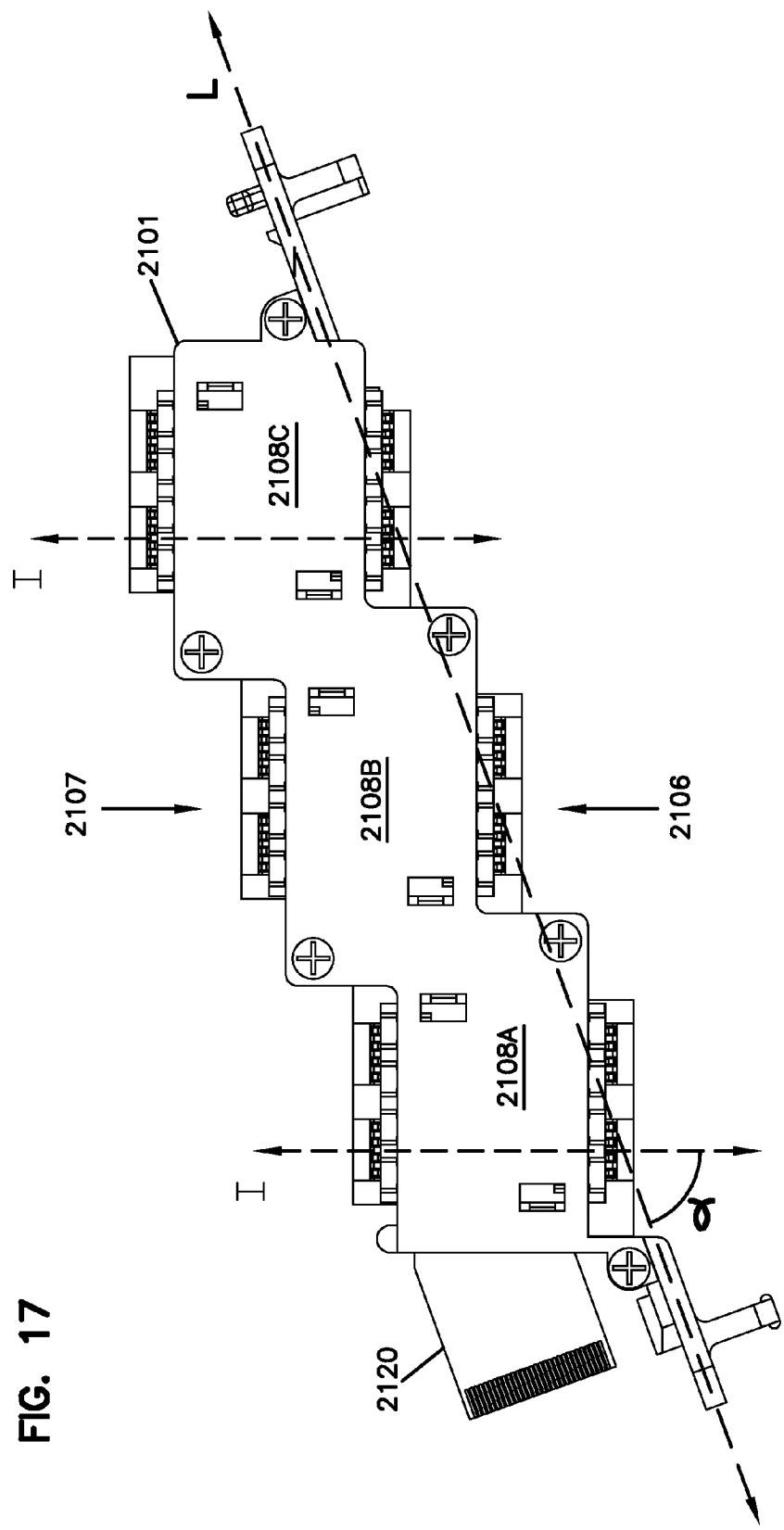
FIG. 17 is a top plan view of the example panel module of FIG. 12 configured in accordance with the principles of the present disclosure.

Each fiber optic adapter assembly 2110 defines one or more connection openings 2111 (FIGS. 16, 19, and 24) configured to connect the optical fibers of two connector arrangements (e.g., connector arrangements 2000 of FIGS. 4-11). Each connection opening 2111 defines a first port 2112 (FIG. 12) that generally faces a first side 2106 of the module housing 2101 and a second port 2113 (FIG. 13) that generally faces a second side 2107 of the housing 2101. The ports 2112, 2113 of each connection opening 2111 have a common insertion axis I (FIG. 17). In some embodiments, the connection openings 2111 of an example adapter assembly 2110 have parallel insertion axes. Moreover, in some embodiments, the connection openings 2111 of each adapter assembly 2110 in an example panel module 2100 have parallel insertion axes (e.g., see FIG. 17). In other embodiments, the adapter assemblies 2110 of a panel module 2100 can define connection openings having non-parallel insertion axes.

In the example shown, each adapter assembly 2110 defines four connection openings 2111. Accordingly, each adapter assembly 2110 defines four first ports 2112 and four second ports 2113. In one embodiment, such an adapter assembly 2110 can be configured to receive eight separate connector assemblies each having one optical fiber. In another embodiment, such an adapter assembly 2110 can be configured to receive four duplex connector arrangements, each having two optical fibers (e.g., connector arrangements 2000 of FIGS. 4-11). In other embodiments, however, each adapter assembly 2110 can define greater or fewer connection openings 2111.

Some example panel modules 2100 can include two or more adapter assemblies 2110. In some such embodiments, the adapter assemblies 2110 can be arranged along one side of the printed circuit board 2120. In other embodiments, the printed circuit board 2120 can be arranged between two or more adapter assemblies 2110. For example, in some embodiments, components (e.g., media reading interfaces 2122) can be arranged on two sides of the printed circuit board 2120. One or more adapter assemblies can be arranged (e.g., in rows) along each side of the board 2120. For example, a first adapter assembly 2110A can be arranged above a first side 2121 of the printed circuit board 2120 and a second adapter assembly 2110B can be arranged below a second side 2123 of the printed circuit board 2120 (e.g., see FIG. 16).

Other example panel modules 2100 can include two or more printed circuit boards 2120. For example, in some embodiments, two printed circuit boards (not shown) can be arranged in parallel between two rows of adapter assemblies 2110. Each printed circuit board can include components (e.g., media reading interfaces 2122) along at least one side of the board for interaction with the nearest adapter assembly 2110. In other embodiments, two or more printed circuit boards (not shown) can be arranged in a coplanar configuration. In such embodiments, each board can service one or more adapter assemblies 2110. The printed circuit boards can be connected together via wiring, soldering, edge connection, etc. In still other embodiments, the panel modules 2100 can include multiple layers of adapter assemblies and printed circuit boards.

In some embodiments, the adapter assemblies 2110 are oriented within the housing 2101 so that the insertion axes I of the connection openings 2111 are generally orthogonal to the longitudinal axis L of the housing 2101 (plus or minus a reasonable tolerance). In other embodiments, however, the adapter assemblies 2110 can be oriented so that the insertion axes I of the connection openings 2111 are arranged at an angle α relative to the longitudinal axis L that is less than 90°. For example, in some embodiments, the angle α can be less than or equal to 75°. In some embodiments, the angle α can be less than or equal to 60° and, in some embodiments, can be less than or equal to 45°. Such angling of the adapter assemblies 2110 within a panel module 2100 may facilitate bend radius management for fibers extending from connector arrangements that have been inserted into the ports of the adapter assemblies 2110.

In some embodiments, the panel module housing 2101 can define a stepped profile (e.g., see steps 2108 of FIG. 17). One or more adapter assemblies 2110 can be arranged within each "step" 2108 of the profile. In some example embodiments, the adapter assemblies 2110 of an example panel module 2100 can be offset from each other along a plane that is orthogonal to the insertion axes I of the adapter assemblies 2110 (e.g., see FIG. 17). In the example shown in FIG. 17, an example panel module housing 2101 defines a profile with three steps: 2108A, 2108B, and 2108C. One adapter assembly 2110 per row is contained within each step 2108A, 2108B, 2108C. In other example embodiments, however, two or more adapter assemblies 2110 can be arranged on each step 2108 of the profile.

In some embodiments, the printed circuit board 2120 has a stepped profile to match the stepped profile of the panel module housing 2101. For example, the printed circuit board 2120 of FIG. 18 defines a profile having three steps 2128A, 2128B, and 2128C. In other embodiments, however, the panel module 2100 can include multiple printed circuit boards 2120 to accommodate the stepped profile of the module housing 2101. For example, each step 2108 in the panel module housing 2101 can house one or more printed circuit boards. In one embodiment, the printed circuit board 2120 is generally flat. In other embodiments, however, the printed circuit board 2120 can be bent, curved, or flexible to accommodate adapter assemblies 2110 in different orientations.

In certain embodiments, the panel module housing 2101 can be formed from multiple pieces. In the example shown in FIG. 18, the panel module housing 2101 includes a first housing portion 2102 and a second housing portion 304 that sandwich the adapter assemblies 2110 and the printed circuit board 2120 therebetween. In one embodiment, the first housing portion 2102 is coupled to the second housing portion 2104 by one or more fasteners 2103 (e.g., screws, rivets, adhesive, etc.). In another embodiment, the first housing portion 2102 can be friction fit, melted, or otherwise connected to the second housing portion 2104. In other embodiments, however, the panel module housing 2101 can be integral or can be formed from three or more pieces.

Figure 18:
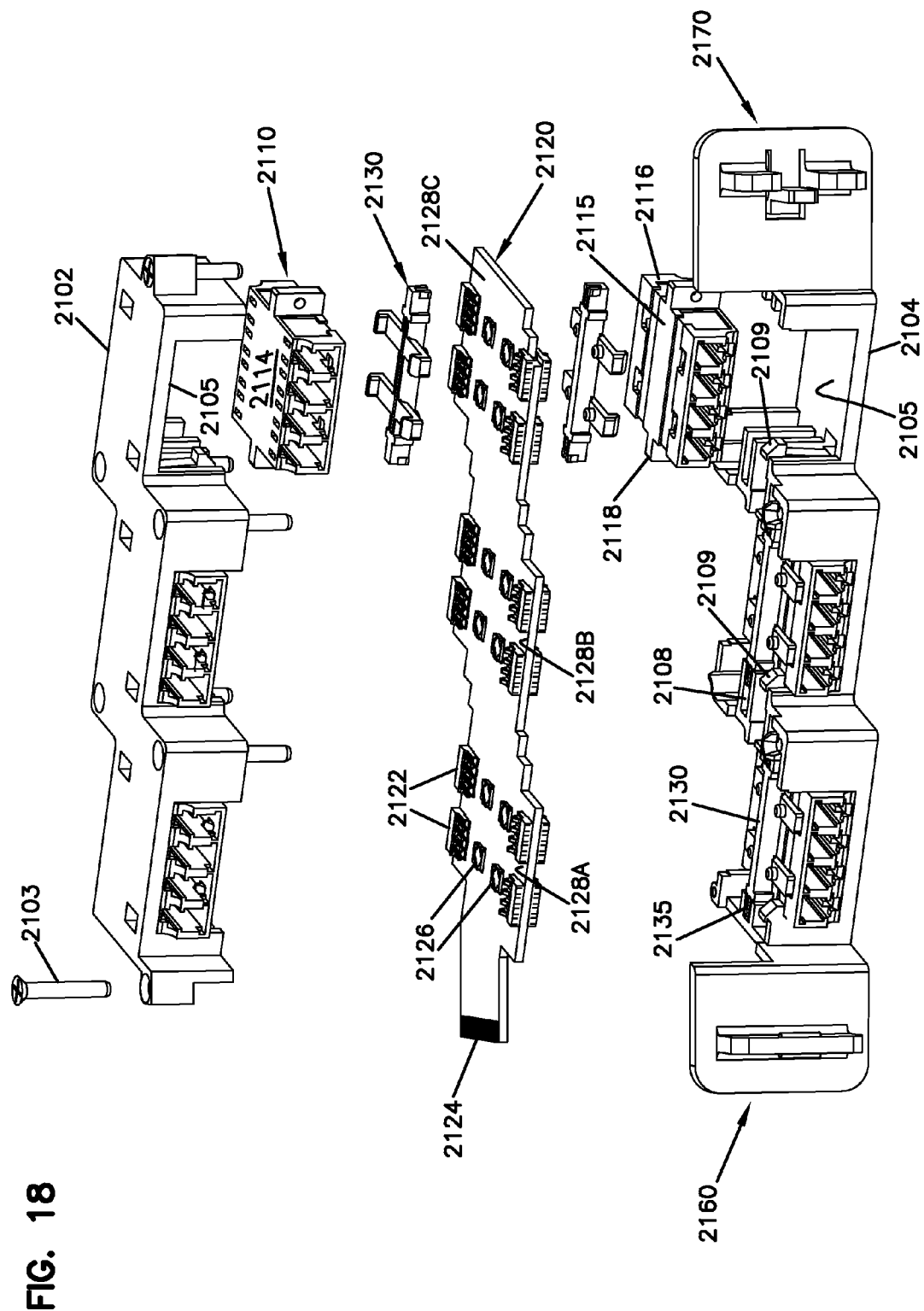
FIG. 18 is an exploded, perspective view of the example panel module of FIG. 12 configured in accordance with the principles of the present disclosure.

Each portion 2102, 2104 of the module housing 2101 can define one or more mounting locations 2105 in which the adapter assemblies 2110 can be mounted. In the example shown, each mounting location 2105 defines a securement channel 2108 and a latch member 2109 (FIG. 18). The latch member 2109 protrudes inwardly from an inner surface of the housing 2101. The latch member 2109 includes a resilient tongue that defines a ramped surface opposite a shoulder. When an adapter assembly 2110 is inserted into the mounting location 2105, the adapter assembly 2110 is pressed against the ramped surface of the latch member 2109. The latch member 2109 is sized and configured to flex away from an adapter assembly 2110 when the adapter assembly 2110 is cammed along the ramped surface. The latch member 2109 flexes back to latch the shoulder against the adapter assembly 2110 when the adapter assembly 2110 clears the ramped surface.

Figure 19:
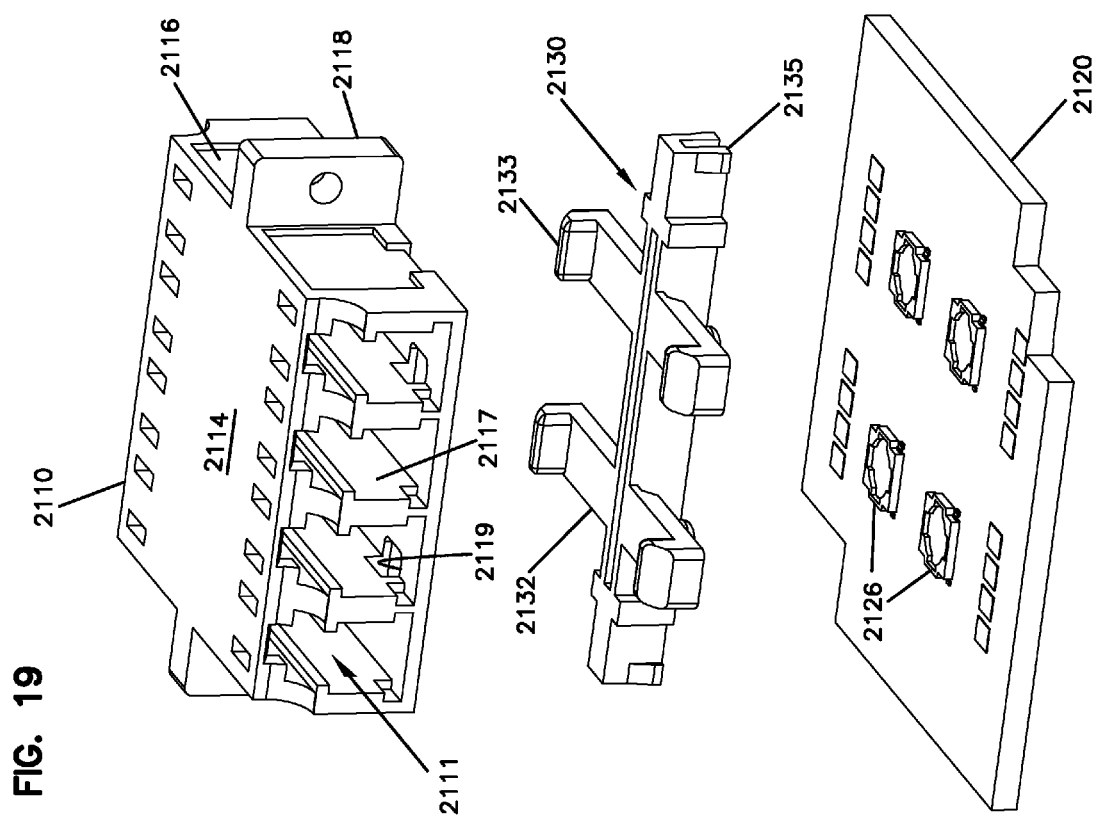
FIG. 19 is a perspective view of an example connector assembly in which an example adapter assembly is exploded from an example printed circuit board configured in accordance with the principles of the present disclosure.
Figure 20:
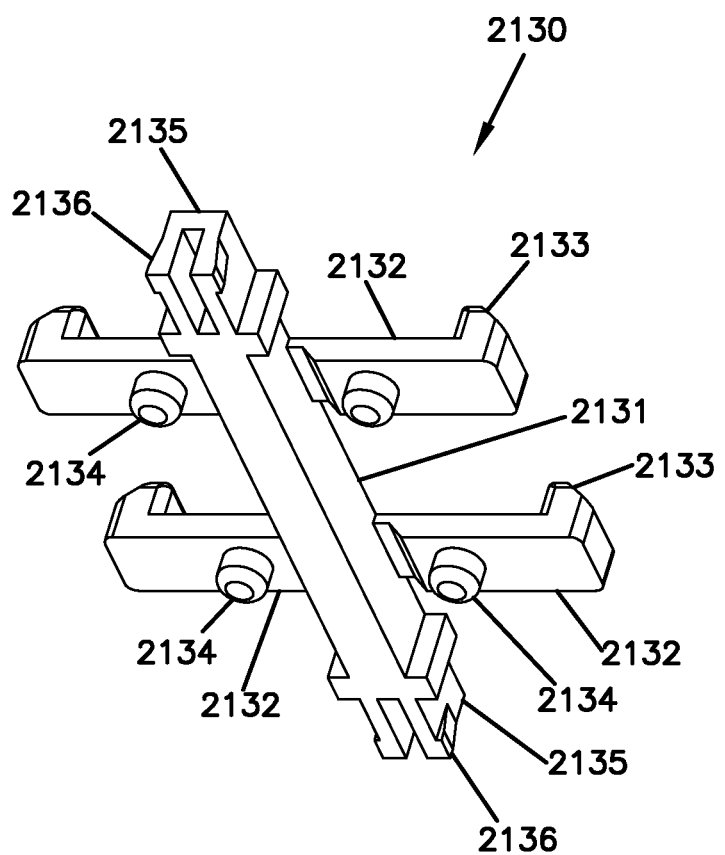
FIG. 20 is a bottom perspective view of an example spring board assembly configured in accordance with the principles of the present disclosure.
Figure 21:
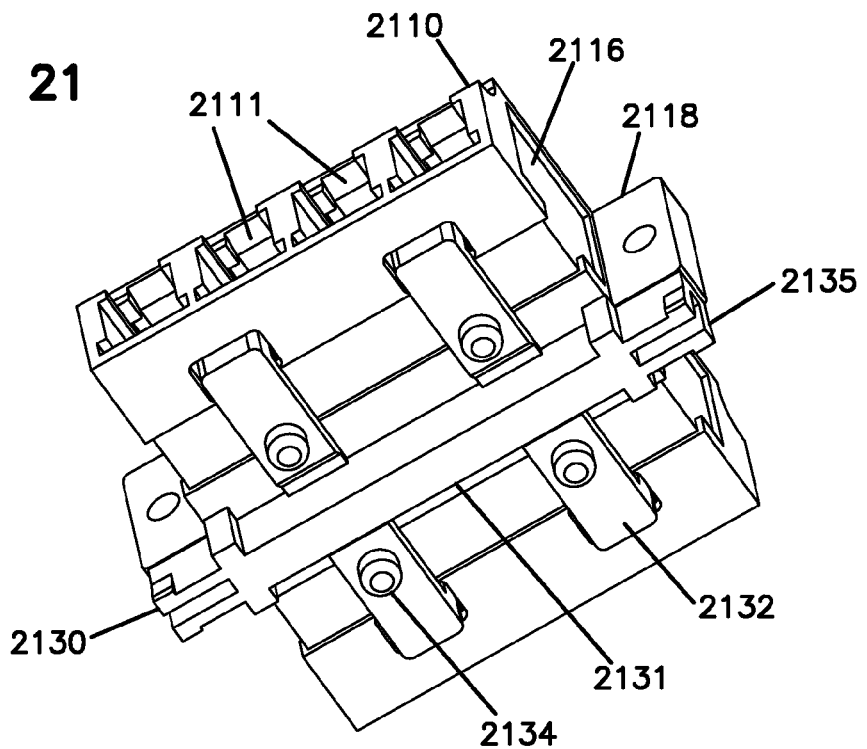
FIG. 21 is a bottom perspective view of the example connector assembly of FIG. 19 with the printed circuit board removed for ease in viewing.

Each adapter assembly 2110 includes a first surface 2114 and an opposite second surface 2115 (FIG. 19). End surfaces 2116 extend between the first and second surfaces 2114, 2115. If the adapter assembly 2110 is configured to receive more than one connector arrangement ferrule on each side, then the adapter assembly 2110 also can include one or more dividing members 2117 extending between the first and second surfaces 2114, 2115 to define the connection openings 2111. In some embodiments, each adapter assembly 2110 also can define mounting flanges 2118 that extend outwardly from the end surfaces 2116. In such embodiments, the securement channels 2108 defined by the housing portions 2102, 2104 at the mounting locations 2105 are configured to receive the mounting flanges 318 of the adapter assemblies 2110 to aid in retaining the adapter assemblies 2110 within the housing portions.

In some embodiments, each housing portion 2102, 2104 can accommodate one row of adapter assemblies 2110. In the example shown, each portion of the panel module housing 2101 defines sufficient mounting locations 2105 to accommodate a row of three adapter assemblies 2110. In other embodiments, however, the panel module housing 2101 can define greater or fewer adapter assembly mounting locations 2105 (e.g., greater or fewer adapter assemblies per row and/or additional rows).

Referring to FIGS. 19-25, in certain embodiments, the printed circuit board 2120 also can include one or more presence sensors 2126 to determine whether or not a connector arrangement (e.g., connector arrangement 2000 of FIGS. 19-25) has been inserted into an adapter assembly 2110. In one embodiment, the printed circuit board 2120 includes one presence sensor 2126 for each connection opening 2111 defined by each adapter assembly 2110. In another embodiment, the printed circuit board 2120 includes one presence sensor 2126 for each connector arrangement that the adapter assemblies are configured to receive.

FIG. 19 is a perspective view of an example connector assembly in which an example adapter assembly 2110 is exploded from a printed circuit board 2120. The adapter assembly 2110 defines four connection openings 2111. The example printed circuit board 2120 includes four media reading interfaces 2122 and four presence sensors 2126. In other embodiments, however, the board 2120 can include any suitable number of components.

In the example shown, the presence sensors 2126 are located inwardly on the printed circuit board 2120 from the corresponding media reading interfaces 2122. In other embodiments, however, the board components can be arranged in any suitable configuration. In the example shown, the presence sensors 2126 include tactile pressure sensors. In other embodiments, however, other types of presence sensors (e.g., near field infra-red sensors, etc.) can be utilized.

A spring board assembly 2130 is arranged between the adapter assembly 2110 and the connection layer 2120. The spring board assembly 2130 is arranged to actuate the respective presence sensor 2126 when a connector arrangement is inserted into one or more ports of the adapter assembly 2110 (e.g., see FIGS. 24 and 25). In some embodiments, each spring board assembly 2130 includes a frame member 2131 and at least one cantilevered arm 2132 (see FIG. 20). In certain embodiments, the spring board assembly 2130 includes a cantilevered arm 2132 for each connector arrangement to be received by the adapter assembly 2110. In the example shown, the spring board assembly 2130 includes four cantilevered arms 2132.

The free end of each cantilevered arm 2132 defines a ramped surface 2133 that protrudes in a first direction. Each cantilevered arm 2132 also includes a button or protrusion 2134 extending in a second direction. In one embodiment, the second direction is generally opposite the first direction. The distal end of each cantilevered arm 2132 is configured to flex (e.g., pivot) in the first and second directions. For example, in one embodiment, each cantilevered arm 2132 can define a section of reduced thickness adjacent the frame member 2131 to form a living hinge. In another embodiment, each cantilevered arm 2132 can be formed from a resilient material configured to enable flexure of the arm 2132 relative to the frame member 2131.

The frame member 2131 can include one or more connecting sections 2135 by which the spring board assembly 2130 can be secured to the panel module 2100. For example, the connecting sections 2135 can include one or more squeezable surfaces that fit above the adapter mounting flanges 2118 in the securement channels 2108 defined in the panel module housing 2101 (e.g., see FIG. 18). In the example shown in FIG. 20, the connecting sections 2135 can define ramped surfaces 2136 that facilitate placement of the connecting surfaces 2135 into the securement channels 2108. In other embodiments, the connecting sections 2135 can couple to the adapter assembly 2110 and/the connection layer 2120 instead of to the panel module housing 2101.

Figure 23:
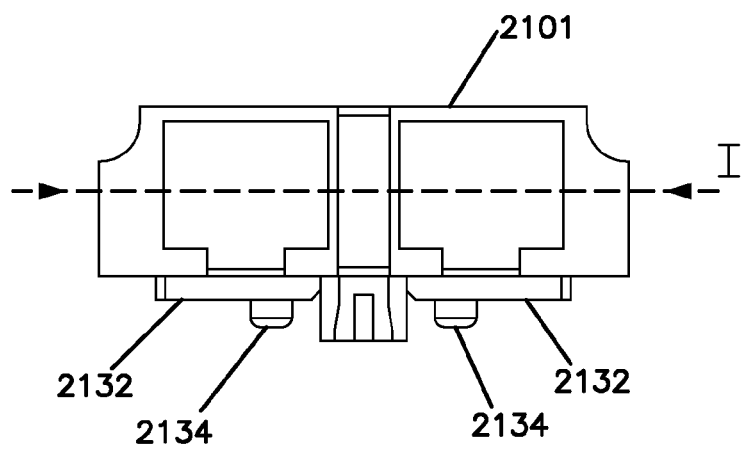
FIG. 23 is a side elevational view of the example connector assembly of FIG. 19 shown without the printed circuit board in accordance with the principles of the present disclosure.
Figure 22:
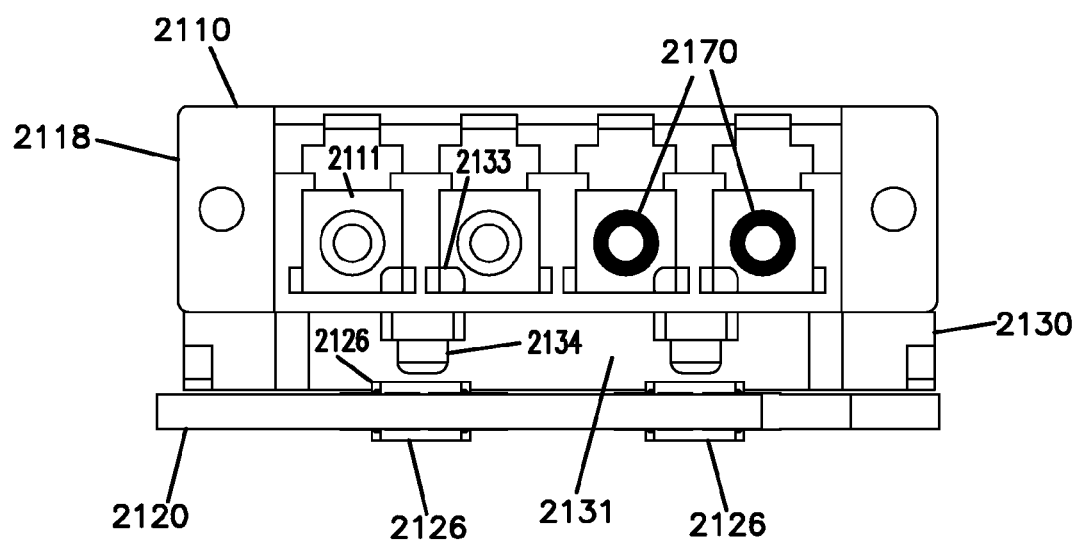
FIG. 22 is a schematic diagram showing a front view of the example connector assembly of FIG. 19 configured in accordance with the principles of the present disclosure.
Figure 24:
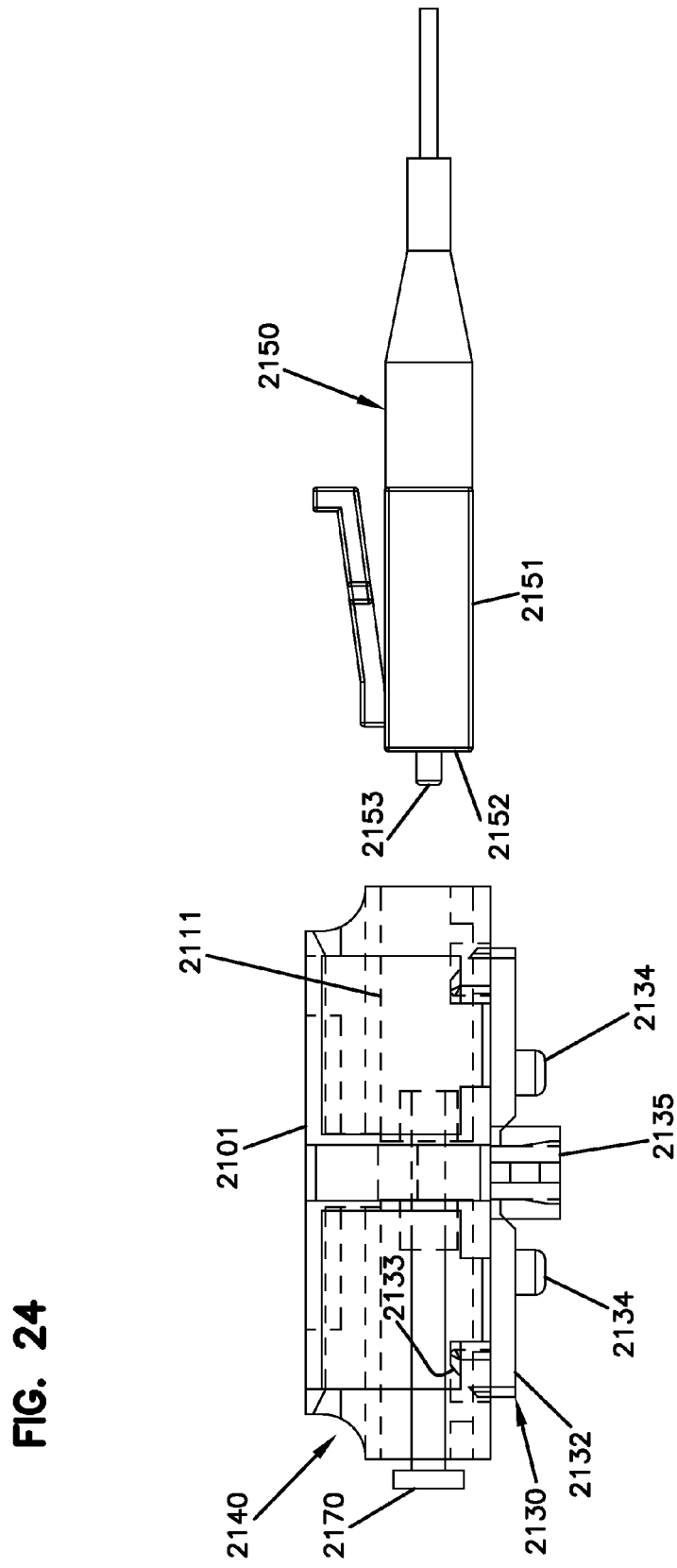
FIGS. 24 and 25 are schematic diagrams showing an example connector arrangement being inserted into a port of an example connector assembly in accordance with the principles of the present disclosure.

The spring board assembly 2130 is configured to extend over the second surface 2115 of an adapter assembly 2110. The second surface 2115 defines one or more openings 2119 sized and configured to enable the ramped surfaces 2133 of the cantilevered arms 2132 of the spring board assembly 2130 to pass through the second surface 2115 and to enter the connection openings 2111 of the adapter assembly 2110. As shown in FIGS. 23 and 24, the cantilevered arms 2132 of the spring board 2130 extend along an exterior of the second surface 2115 and the ramped surfaces 2133 protrude through the openings 2119 into the adapter assembly 2110. The ramped surfaces 2133 face outwardly from the connection openings 2111.

Figure 25:
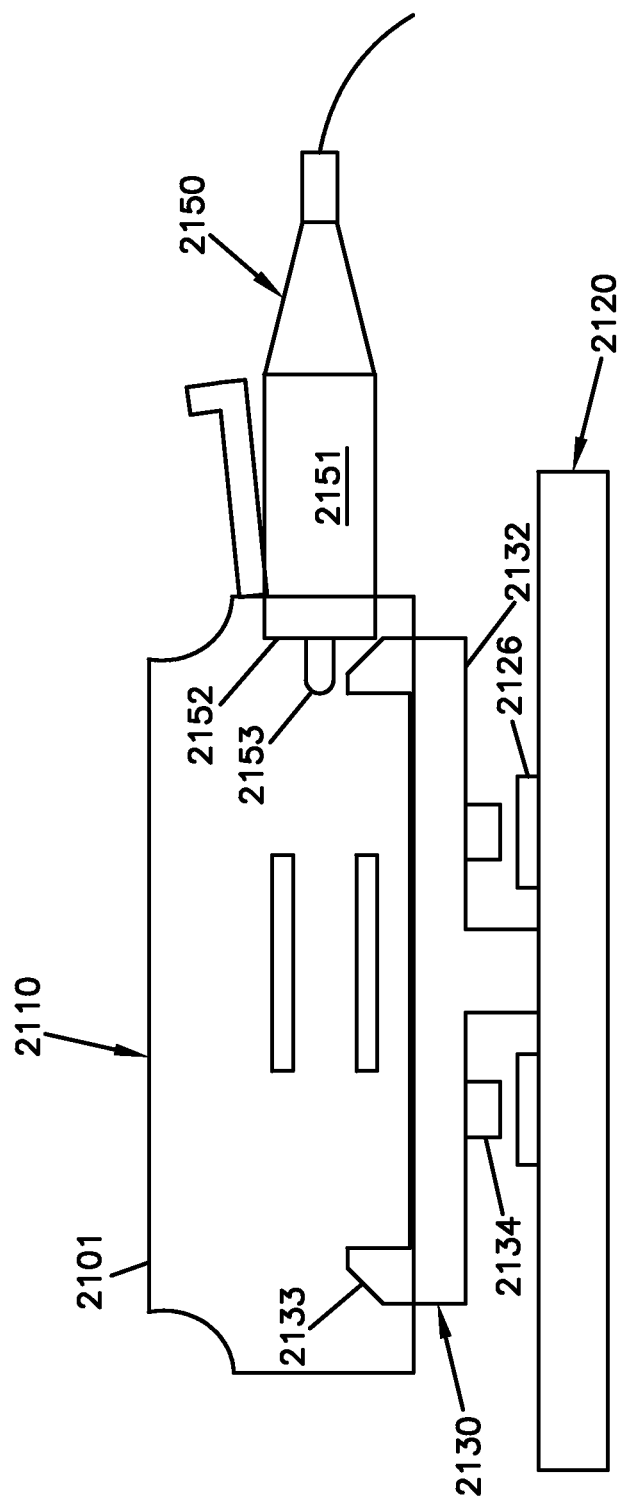
Figure 26:
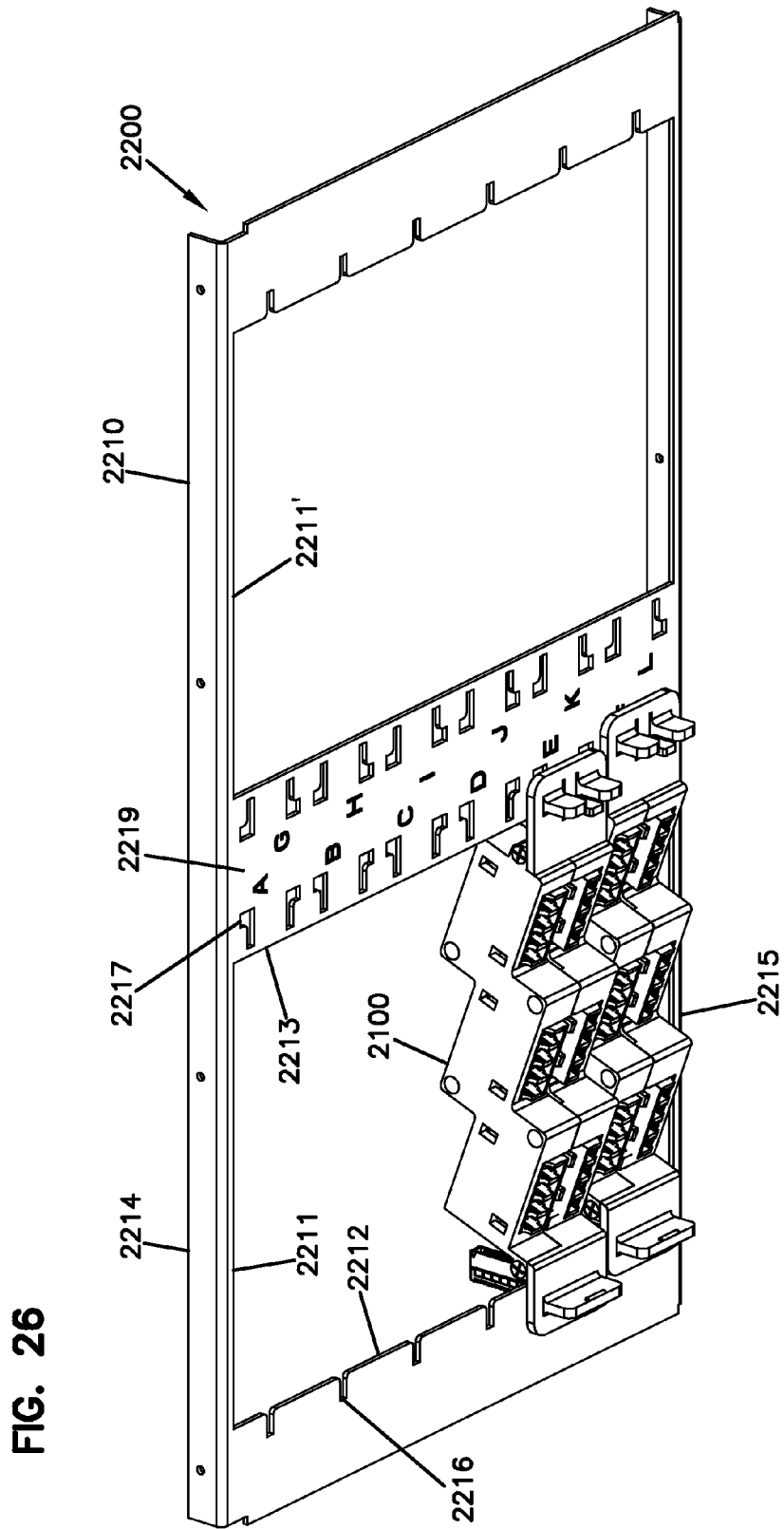
FIG. 26 is a perspective view of an example fiber panel system including panel modules mounted to a support frame in accordance with the principles of the present disclosure.
Figure 27:
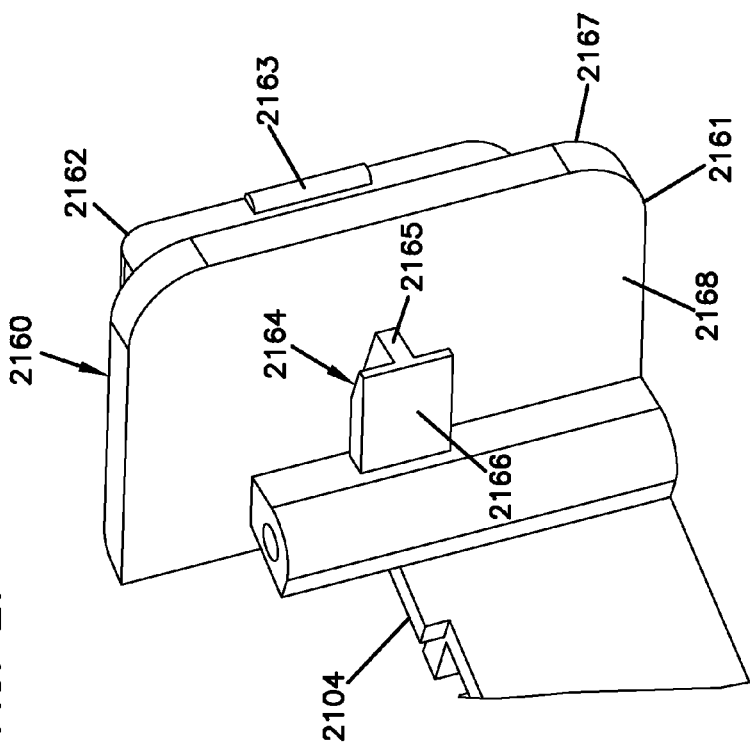
FIG. 27 is a perspective view of an example guide arrangement shown separate from the panel module housing in accordance with the principles of the present disclosure.

FIGS. 24 and 25 are schematic diagrams showing an example connector arrangement 2150 being inserted into a port of an example connector assembly 2140. The connector assembly 2140 includes an adapter assembly 2110, a printed circuit board 2120, and a spring board 2130. Embodiments of the connector assembly 2140 can be included within a panel module 2100 as described above. For ease and convenience, only the connector arrangement 2150 is shown being inserted. In use, another connector arrangement or a fiber optic connector without a storage device may already be contained within an opposite port.

The connector arrangement 2150 includes a connector body 2151 housing a ferrule 2153, which carries a polished end face of an optical fiber (not shown). The connector body 2151 defines an end face 2152 through which the ferrule 2153 extends. The end face 2152 of the connector body 2151 is configured to interact with the ramped surface 2133 of the cantilevered arm 2132 of the spring board assembly 2130 to depress the arm 2132. In one embodiment, the end face 2152 is configured to cam over the ramped surface 2133 to depress the arm 2132 so that the ramped surface 2133 does not contact the ferrule 2153.

Depressing the ramped surface 2133 causes the arm 2132 to move away from the adapter assembly 2110 toward the printed circuit board 2120 (e.g., see FIG. 25). The button 2134 protruding from the arm 2132 is positioned above the tactile pressure sensor 2126 of the printed circuit board 2120. Accordingly, depressing the ramped surface 2133 causes the button 2134 to contact and actuate the tactile pressure sensor 2126. Positioning the button 2134 inwardly from the free end of the arm 2132 inhibits the button 2134 from pressing against the sensor 2126 with too great a force. If necessary, the arm 2132 can flex/bend to accommodate the pressure sensor 2126 when the ramped surface 2133 is depressed.

In the example shown in FIGS. 21-25, each cantilevered arm 2132 of the spring board assembly 2130 extends between two adjacent connection openings 2111 defined in the adapter assembly 2110. Accordingly, insertion of a connector body into either one (or both) of the connection openings 2111 depresses the arm 2132 of the spring board assembly 2130 and actuates the presence sensor 2126. Such an embodiment may be useful when the adapter assembly is configured to receive duplex connector arrangements. In other embodiments, a cantilevered arm 2132 of the spring board assembly 2130 can extend into each connection opening 2111.

In certain embodiments, the adapter assemblies 2110 can include adapter dust caps 2170 (FIG. 22) mounted within the ports. In general, adapter dust caps 2170 define bodies sized to fit within or around alignment sleeves (e.g., split sleeves) housed within the connection openings 2111. In one example embodiment, the adapter dust caps 2170 are generally cylindrical in shape. In some embodiments, the cantilevered arms 2132 of the spring board 2130 are sized and positioned to inhibit interaction with adapter dust caps 2170. For example, the cantilevered arms 2132 can be configured and arranged so that insertion of an adapter dust cap 2170 does not depress the cantilevered arm 2132 to actuate the pressure sensor 2126. In the example shown in FIG. 22, the ramped surfaces 2133 of the cantilevered arms 2132 extend between adjacent connection openings 2111. The cantilevered arms 2132 and/or the adapter dust caps 2170 are sufficiently narrow to inhibit contact between the cantilevered arms 2132 and the dust caps 2170.

Referring now to FIGS. 26-31, one or more panel modules 2100 can be arranged in a fiber panel system 2200. The fiber panel system 2200 includes a support frame 2210 defining at least one opening 2211 for mounting one or more panel modules 2100. In one embodiment, the support frame 2210 can form part of a chassis housing. The opening 2211 is defined by a first mounting member 2212 and a second mounting 2213 of the support frame 2210. The opening 2211 can be further defined by a first connecting member 414 and a second connecting member 2215 of the support frame 2210 that interconnect the first and second mounting members 2212, 2213.

In the example shown, the opening 2211 is sized and configured to enable multiple panel modules 2100 to be mounted within the opening 2211. In other embodiments, the support frame 2210 can define separate openings 2211 for each panel module 2100. In the example shown in FIG. 26, the support frame 2210 defines a second opening 2211' adjacent the first opening to enable the panel modules 2100 to mount to the support frame 2210 in two columns. The second opening 2211' also is defined by mounting members and connecting members. In other embodiments, however, the support frame 2210 can define any suitable configuration of openings to enable any desired configuration of panel modules 2100.

Figure 30:
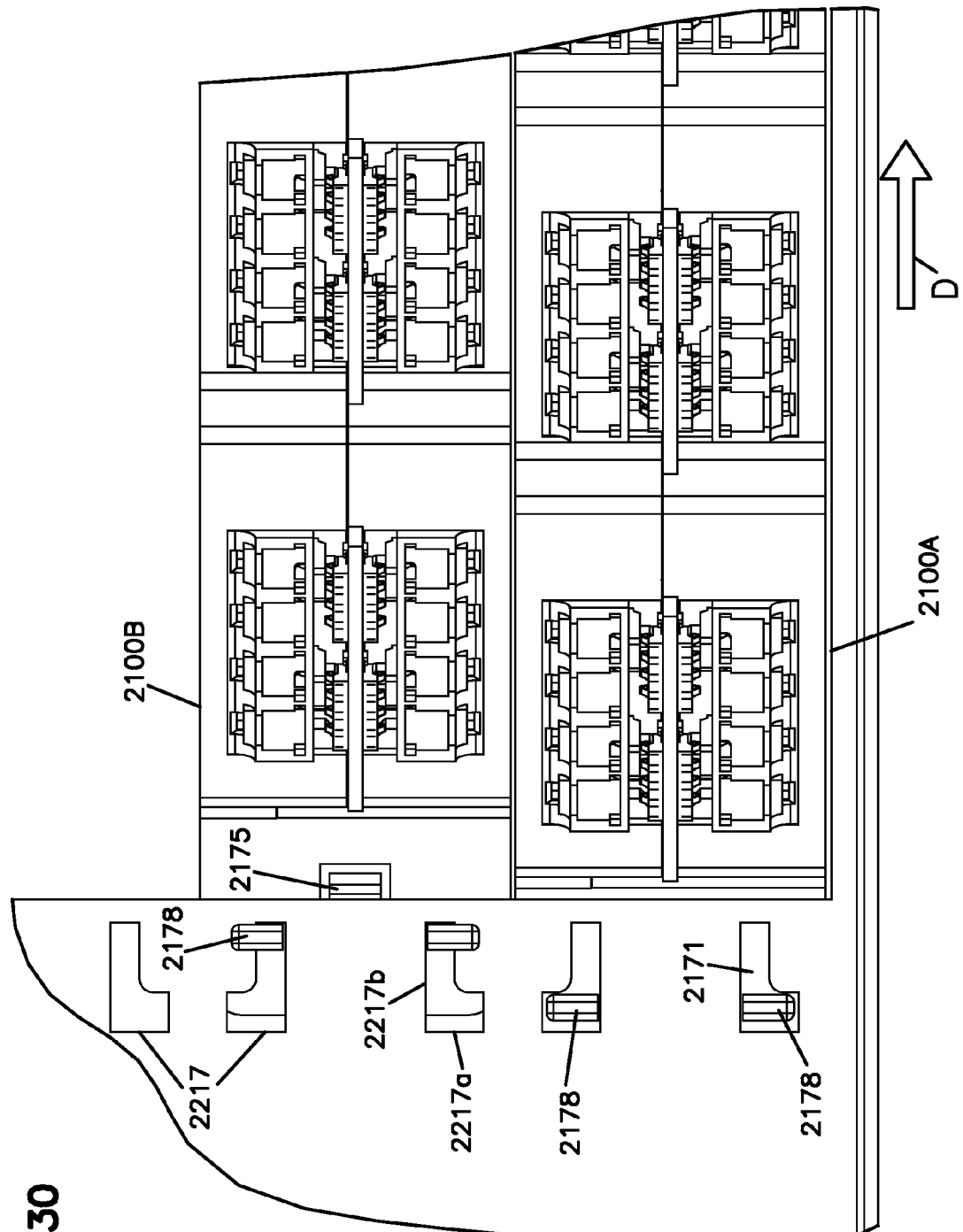
FIGS. 30 and 31 are partial, rear views of the example fiber panel system of FIG. 26 in accordance with the principles of the present disclosure.

The first mounting member 2212 of the support frame 2210 defines at least one slot 2216 and the second mounting member 2213 defines at least a pair of latching openings 2217. In other embodiments, however, the first mounting member can define the latching openings 2217 and the second mounting member 2213 can define the slots 2216. Each of the latching openings 2217 defines a "sideways L" shape including a base portion 2217a and an extended portion 2217b (FIG. 30). The latching openings 2217 in each pair are oriented to face away from each other (i.e., the base portions 2217a extend away from each other). In one embodiment, the latching openings 2217 of the second mounting member 2213 are further oriented to face the base portions 2217a of the openings 2217 away from the slots 2216 of the first mounting member 2212.

The support frame 2210 also can define indicia for identifying or conveying other information about the panel modules 2100 mounted thereto. For example, the support frame 2210 can include a series of labels 2219 arranged along one of the mounting members 2212, 2213. In the example shown, labels 2219 are provided along a center of the support frame 2210 between the two openings 2211, 2211' (i.e., along the central mounting members).

Figure 28:
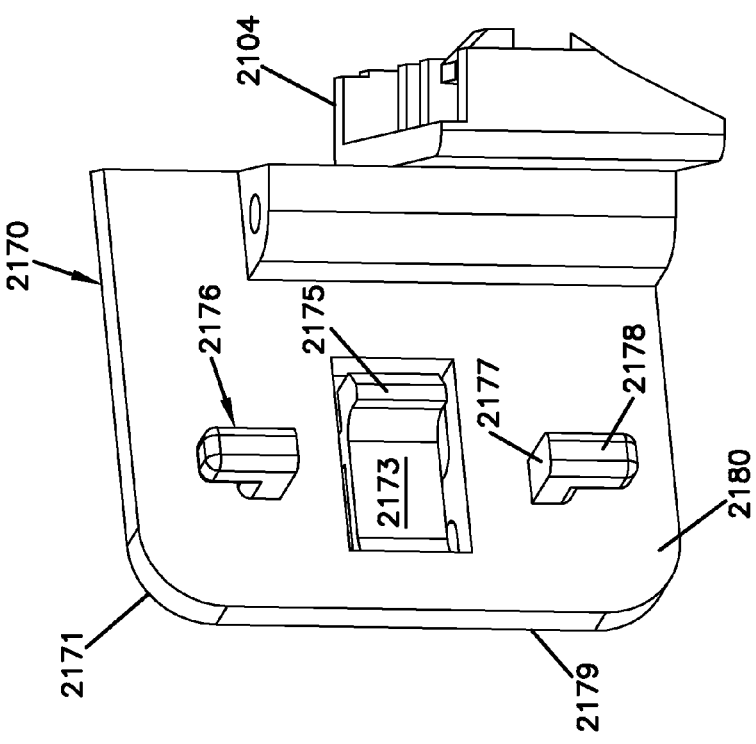
FIG. 28 is a perspective view of an example latching arrangement shown separate from the panel module housing in accordance with the principles of the present disclosure.

In certain embodiments, the housing 2101 of each panel module 2100 includes a securement assembly to facilitate mounting the panel module 2100 to the support frame 2210. In some embodiments, the securement assembly includes a guide arrangement 2160 (FIG. 27) and a latching arrangement 2170 (FIG. 28). In one embodiment, the guide arrangement 2160 is arranged at a first end of the panel module 2100 and the latching arrangement 2170 is arranged at a second end of the panel module 2100. In other embodiments, however, the guide arrangement 2160 and latching arrangement 2170 can be positioned in any suitable configuration on the panel module 2100.

The guide arrangement 2160 includes a base 2161 extending outwardly from the housing 2101. In one embodiment, the base 2161 is integral with the module housing 2101. In other embodiments, the base 2161 can be mechanically or chemically coupled to the module housing 2101. The base 2161 defines a first side 2167 and a second side 2168. At least one handhold 2162 extends outwardly from the first side 2167 of the base 2161. In one embodiment, the handhold 2162 defines a grip region 2163. The handhold 2162 can be manipulated by the user to move the panel module 2100 within the support frame 2210.

A guide member 2164 protrudes outwardly from the second side 2168 of the base 2161. The guide member 2164 includes an extension member 2165 and a stop flange 2166 coupled to an end of the extension member 2165. The stop flange 2166 extends generally parallel with the base 2161. An inner surface of the stop flange 2166 can define a ramped surface. The guide member 2164 is sized and configured to interact with one of the slots 2216 defined in the first mounting member 2212 of the support frame 2210. For example, the extension member 2165 of the guide member 2164 is configured to slide within the slot 2216 so that the base 2161 abuts against one side of the frame 2210 and the stop flange 2166 abuts against the opposite side of the frame 2210 to secure the panel module 2100 to the frame 2210. In one embodiment, the ramped inner surface of the stop flange 2166 may facilitate aligning the guide member 2164 with the slot 2216.

The latching arrangement 2170 includes a base 2171 extending outwardly from the module housing 2101 and defining a first side 2179 and a second side 2180. In one embodiment, the base 2171 is integral with the module housing 2101. In other embodiments, the base 2171 can be mechanically or chemically coupled to the module housing 2101. At least one handhold 2172 extends outwardly from the first side 2179 of the base 2171. The handhold 2172 can be manipulated by the user to move the panel module 2100 within the support frame 2210. In the example shown, two handholds 2172 are arranged on the first side 2179 of the base 2171. In other embodiments, however, greater or fewer handholds 2172 can be arranged on the base 2171.

The base 2171 also defines an opening in which a resilient tongue 2173 extends. The resilient tongue 2173 can be moved toward the first and second sides 2179, 2180 from a position in which the tongue 2173 extends planar to the base 2171. A release tab 2174, which will be described in greater detail herein, extends outwardly from the resilient tongue 2173 on the first side 2179 of the base 2171. In one embodiment, the release tab 2174 extends outwardly from an intermediate position on the resilient tongue 2173. A latching stop 2175 extends outwardly from the resilient tongue 2173 on the second side 2180 of the base 2171. In one embodiment, the latching stop 2175 extends outwardly from a free end of the resilient tongue 2173.

The latching arrangement 2170 also includes at least one securement member 2176 extending outwardly from the second side 2180 of the base 2171. In the example shown, the securement member 2176 generally defines an "L" shape protruding outwardly from the second side 2180 of the base 2171. The securement member 2176 includes an extension member 2177 forming the extended portion of the "L" and a stop member 2178 forming the base of the "L". In other embodiments, however, the securement member 2176 can define a "T" shape, a "J" shape, or another suitable shape. In the example shown, the two opposing securement members 2176 are arranged on the base 2171. In other embodiments, greater or fewer securement members 2176 can be arranged on the base 2171.

A panel module 2100 can be secured to the support frame 2210 using the guide arrangement 2160 and latching arrangement 2170. In general, panel modules 2100 can be mounted to the support frame 2210 by inserting the panel modules 2100 into the opening 2211 defined by the support frame 2210 and sliding the panel modules 2100 along a latching axis D (FIG. 29) toward the first mounting member 2212 of the support frame 2210. In certain embodiments, the securement members 2176 of the latching arrangement 2170 are inserted into two of the latching openings 2217 of the second mounting member 2213 and the guide member 2164 of the guide arrangement 2160 is aligned with a corresponding slot 2216 of the first mounting member 2212. The panel module 2100 is slid along the latching axis (e.g., along the length of the latching openings 2217) to latch the panel module 2100 to the support frame 2210 as described herein.

Figure 29:
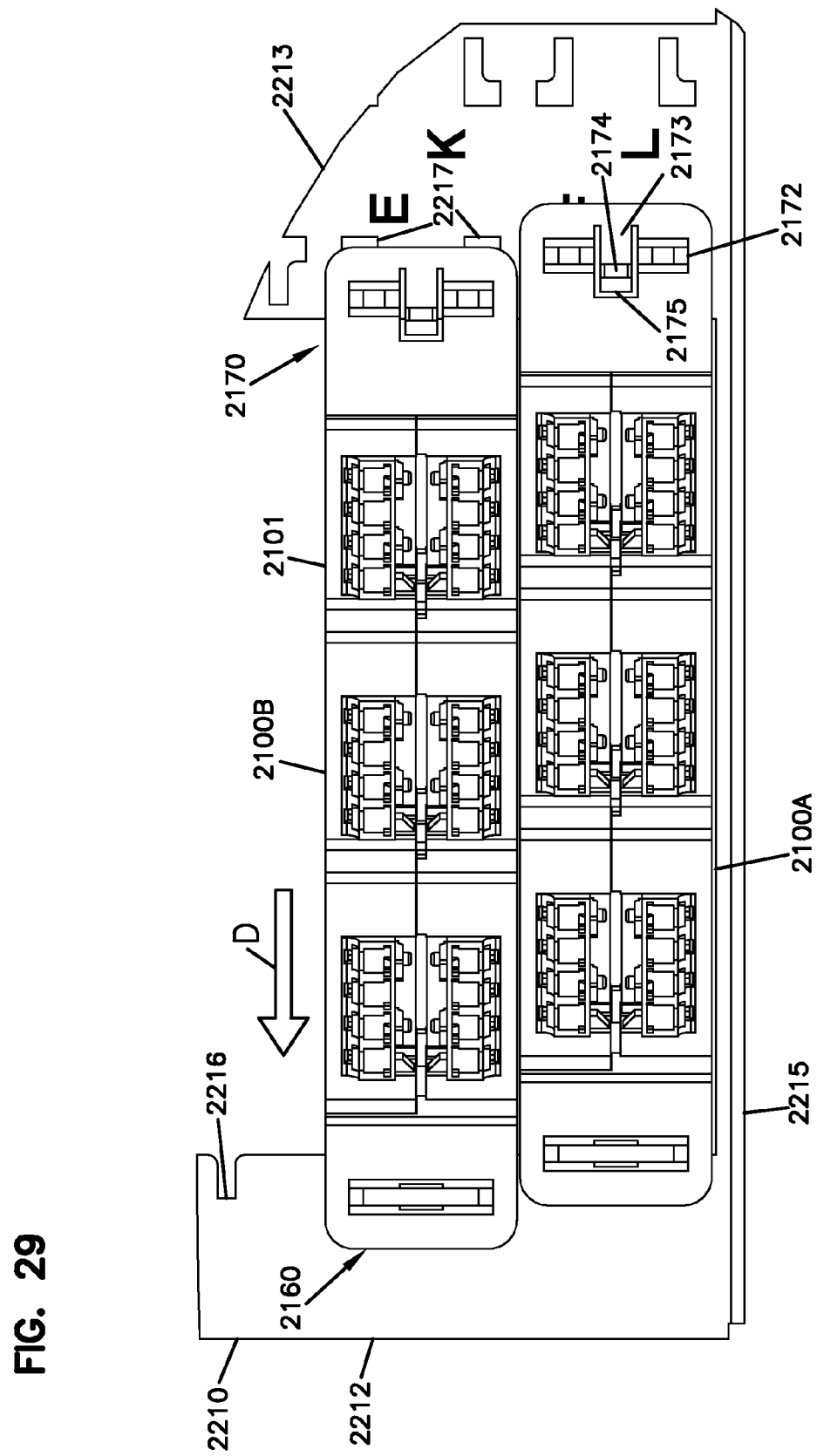
FIG. 29 is a partial, front view of the example fiber panel system of FIG. 26 in accordance with the principles of the present disclosure.
Figure 31:
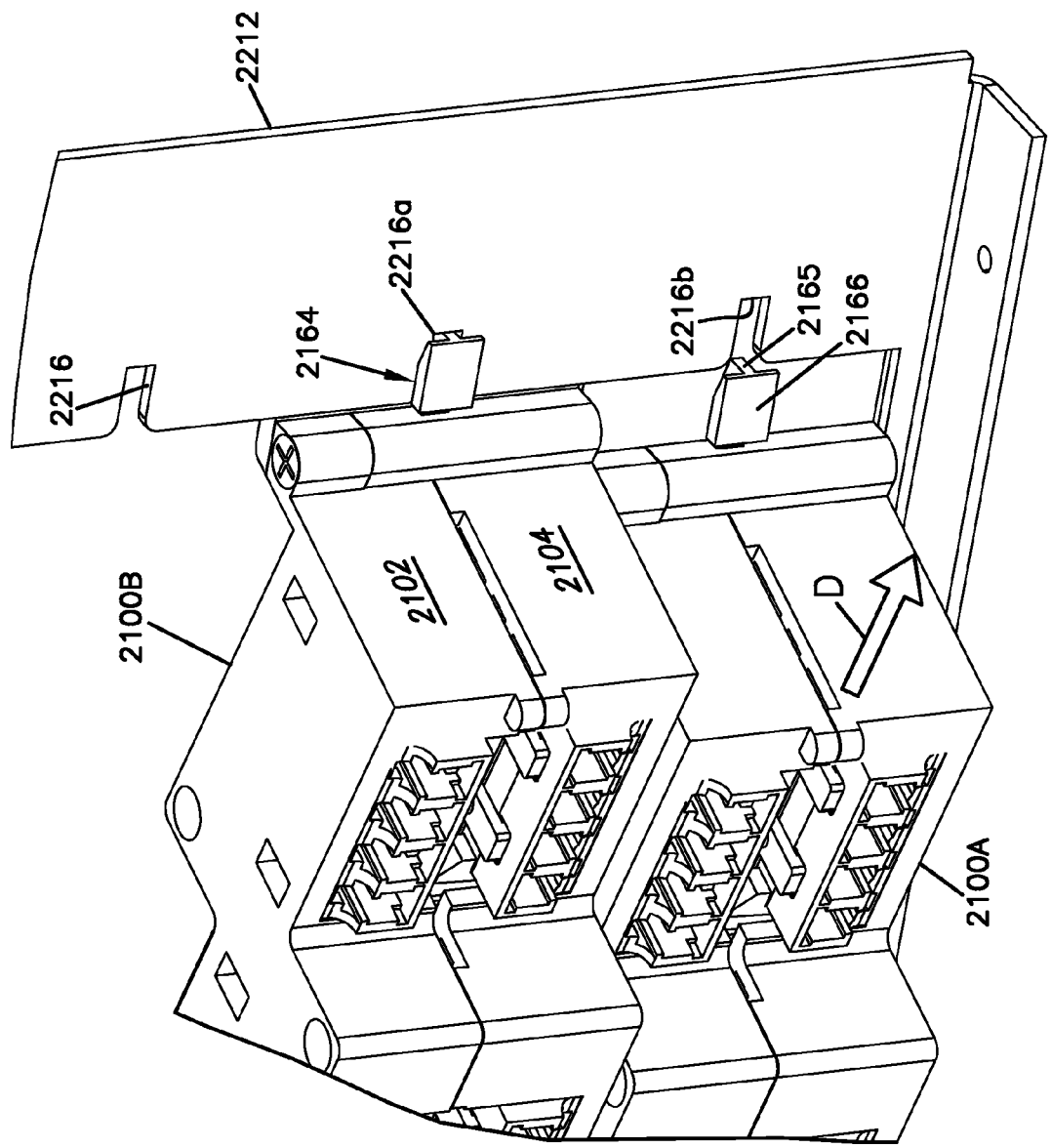

FIGS. 29-31 show a first panel module 2100A installed on the support frame 2210 and a second panel module 2100B that is in the process of being installed on the support frame 2210. As shown in FIG. 30, the securement members 2176 of the latching arrangement 2170 of each panel module 2100 are inserted into the latching openings 2217 defined in the second mounting member 2213. In the example shown in FIG. 30, the base portion 2217a of each latching opening 2217 is sized and configured to enable the stop member 2178 of one of the securement members 2176 to pass therethrough. For example, the securement members 2176 of the first panel module 2100A shown in FIG. 31 have been inserted into the latching openings 2217, but have not yet slid along the latching axis D. Accordingly, the first panel module 2100A can still be pulled out of the opening 2211 of the support frame 2210.

Sliding the panel module 2100 along the latching axis D toward the first mounting member 2212 causes the extension member 2177 of the securement member 2176 to slide through the extended portion 2217b of the latching opening 2217. The extended portion 2217b of the latching opening 2217 is sized and configured to inhibit passage of the stop member 2178 therethrough. For example, the latching arrangement 2170 on the second panel module 2100B holds the second mounting member 2213 of the support frame 2210 between the base 2171 and the stop members 2178 of the securement members 2176. Accordingly, the second panel module 2100B cannot be pulled out of the opening 2211 of the support frame 410 without sliding the second panel module 2100B back along the latching axis D.

When the securement members 2176 are inserted into the latching openings 2217, movement of the panel module 2100A along the latching axis D is restricted (e.g., to the length of the latching opening 2217). The latching stop 2175 on the resilient tongue 2173 abuts against an edge of the second mounting member 2213. Sandwiching the edge of the second mounting member 2213 between the securement members 2176 and the latching stop 2175 inhibits movement of the panel module 2100 along the latching axis D.

As shown in FIG. 31, the extension member 2165 of the guide arrangement 2160 of the first panel module 2100A is aligned with a slot 2216A defined in the first mounting member 2212. A portion of the first side 2167 of the base 2161 extends over the first side of the support frame 2210. Sliding the panel module 2100A toward the first mounting member 2212 will slide the guide member 2164 into the slot 2216A and secure the first mounting member 2212 between the base 2161 and the stop flange 2166 of the guide member 2164. For example, the guide arrangement 2160 on the second panel module 2100B holds the first mounting member 2212 of the support frame 2210 between the base 2161 and the stop flange 2166. The extension member 2165 of the guide arrangement 2160 of the second panel module 2100B extends through a slot 2216B defined in the first mounting member 2212.

To release the panel modules 2100 from the support frame 2210, a user actuates the release tab 2174 on the resilient tongue 2173. In the example shown, pressing on the release tab 2174 pivots the resilient tongue 2173 toward the first side 2179 of the base 2171, which pivots the latching stop 2175 out of latching engagement with the edge of the second mounting member 2213. When the latching stop 2175 is moved out of latching engagement with the second mounting member 2213, the panel module 2100 can be slid along the latching axis D toward the second mounting member 2213 to align the securement members 2176 of the panel module 2100 with the base portion 2217a of the latching openings 2217. When the securement members 2176 are so aligned, the panel module 2100 can be removed from the opening 2211 defined in the support frame 2210.

When attached to the support frame 2210, the panel modules 2100 can be connected to a physical layer management network. For example, the support frame 2210 can be coupled to a chassis housing in which a processor (e.g., a programmable processor) is arranged. In one example embodiment, the processor is arranged on one or more printed circuit boards mounted within the chassis housing. The network interface 2124 of each panel module 2100 can communicatively couple (e.g., via a card-edge type connection, a connector-to-connector type connection, or a cable connection) to the printed circuit board(s) mounted within the chassis housing. For example, sliding the panel modules 2100 along latching axis D can slide the network interface 2124 of each panel module 2100 into a circuit board connector.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

We claim:

1. A connector assembly comprising:
a housing defining a stepped profile along a longitudinal axis of the housing;
a plurality of adapter assemblies mounted within the housing, at least one adapter assembly is accommodated within the housing at each step of the profile, each adapter assembly defining at least a first port and a second port that are configured to connect optical fibers terminated by two connector arrangements;
a printed circuit board mounted within the housing;
a first media reading interface installed on and electrically coupled to the printed circuit board, the media reading interface being located adjacent the first port of a first of the adapter assemblies;
a plurality of tactile pressure sensors installed on the printed circuit board, each tactile pressure sensor being associated with the first port of a respective one of the adapter assemblies; and
a spring board assembly positioned between the adapter assemblies and the printed circuit board, the spring board assembly including a body having a plurality of lever arms that align with the tactile pressure sensors so that when a connector arrangement is inserted into the first port of any of the adapter assemblies, the spring board assembly is configured to actuate the associated tactile pressure sensor.

2. The connector assembly of claim 1, wherein the printed circuit board includes a card edge interface defined along one end of the printed circuit board to connect the printed circuit board to a physical layer management network.

3. A connector assembly comprising:
a housing including a first portion and a second portion that is configured to secure to the first portion;
a plurality of first adapter assemblies mounted within the first portion of the housing, each first adapter assembly defining at least a first port and a second port that are configured to connect optical fibers terminated by two connector arrangements;
a plurality of second adapter assemblies mounted within the second portion of the housing, each second adapter assembly defining at least a first port and a second port that are configured to connect optical fibers terminated by two connector arrangements;
a printed circuit board mounted within the housing between the first and second adapter assemblies, the printed circuit board including a first side facing the first adapter assemblies and an oppositely-facing second side that faces the second adapter assemblies;
a first media reading interface installed on the first side of the printed circuit board, the first media reading interface being located adjacent one of the ports of one of the first adapter assemblies; and
a second media reading interface installed on the second side of the printed circuit board, the second media reading interface being located adjacent one of the ports of one of the second adapter assemblies.

4. The connector assembly of claim 3, wherein the printed circuit board defines a card-edge connector.

5. The connector assembly of claim 3, further comprising a plurality of additional media reading interfaces installed on the printed circuit board, each additional media reading interface being located adjacent one of the ports of one of the adapter assemblies.

6. A connector assembly comprising:
a housing enclosing at least a first adapter assembly, the first adapter assembly defining a plurality of first ports and a plurality of second ports, the first and second ports being configured to connect optical fibers terminated by connector arrangements;
a printed circuit board mounted within the housing adjacent the first adapter assembly;
at least a first tactile pressure sensor installed on the printed circuit board adjacent at least one of the first ports of the first adapter assembly; and
a spring board assembly positioned within the housing between the first adapter assembly and the printed circuit board, the spring board assembly including a frame member having at least one cantilevered arm that is configured to flex in a first direction and a second direction, the cantilevered arm defining a ramped surface that protrudes in the first direction and a button that protrudes in the second direction, the spring board assembly being arranged on the printed circuit board to align the button with the tactile pressure sensor and to align the ramped surface with the at least one port of the first adapter assembly.

7. The connector assembly of claim 6, wherein the adapter assembly defines an opening configured to enable the ramped surface of the cantilevered arm to enter the first port of the adapter assembly, wherein insertion of a connector arrangement within the first port depresses the ramped surface, thereby pressing the button against the tactile pressure sensor.

8. The connector assembly of claim 7, further comprising an adapter dust cap, wherein the adapter dust cap and the ramped surface of the cantilevered arm are shaped and configured so that insertion of the adapter dust cap into the first port does not depress the cantilevered arm.

9. The connector assembly of claim 8, wherein the adapter dust cap is generally cylindrical in shape.

10. The connector assembly of claim 6, further comprising a plurality of additional tactile pressure sensors installed on the printed circuit board, wherein the frame member has multiple cantilevered arms, each arm being configured to flex in the first and second directions, each cantilevered arm also defining a ramped surface that protrudes in the first direction and a button that protrudes in the second direction, wherein the button of each cantilevered arms aligns with one of the additional tactile pressure sensors.

11. The connector assembly of claim 10, wherein the ramped surface of each cantilevered arm of the frame member is positioned intermediate two of the ports of the first adapter assembly.

12. A method of determining whether a connector arrangement is retained in a port of a connector assembly into which a ramped surface of a spring board assembly is biased, comprising:

removing a dust cap from the port defined in the connector assembly without affecting a position of the ramped surface of the spring board assembly; and inserting a connector arrangement within the port of the connector assembly, wherein inserting the connector arrangement includes:

camming the ramped surface of the spring board assembly to depress the ramped surface out of the port of the connector assembly;

depressing a portion of the spring board assembly toward a tactile pressure sensor installed within the connector assembly by depressing the ramped surface;

actuating the tactile pressure sensor by contacting the tactile pressure sensor with the depressed portion of the spring board assembly; and triggering a status change in a status accumulation device by actuating the tactile pressure sensor.

\* \* \* \* \*